United States Patent
Patterson et al.

(10) Patent No.: US 10,912,262 B2
(45) Date of Patent: Feb. 9, 2021

(54) PLANT SUPPORT AND TRAINING SYSTEM AND METHOD OF OPERATION THEREOF

(71) Applicant: Mighty Crop, LLC, San Francisco, CA (US)

(72) Inventors: Daniel William Patterson, Oakland, CA (US); Carl Herman Haken, San Francisco, CA (US)

(73) Assignee: Mighty Crop, LLC, San Francisco, CA (US)

( * ) Notice: Subject to any disclaimer, the term of this patent is extended or adjusted under 35 U.S.C. 154(b) by 0 days.

(21) Appl. No.: 16/493,179

(22) PCT Filed: Mar. 16, 2018

(86) PCT No.: PCT/US2018/023024
§ 371 (c)(1),
(2) Date: Sep. 11, 2019

(87) PCT Pub. No.: WO2018/170489
PCT Pub. Date: Sep. 20, 2018

(65) Prior Publication Data
US 2020/0068812 A1 Mar. 5, 2020

Related U.S. Application Data

(60) Provisional application No. 62/472,378, filed on Mar. 16, 2017.

(51) Int. Cl.
*A01G 9/12* (2006.01)
*A01G 17/04* (2006.01)
*F16B 7/04* (2006.01)

(52) U.S. Cl.
CPC .............. *A01G 9/12* (2013.01); *A01G 17/04* (2013.01); *F16B 7/0433* (2013.01)

(58) Field of Classification Search
CPC .......... A01G 9/12; A01G 9/128; A01G 17/04; A01G 17/06; A01G 17/10
See application file for complete search history.

(56) References Cited

U.S. PATENT DOCUMENTS

| 154,155 | A | 8/1874 | Setchell |
| 194,102 | A | 8/1877 | Muller |
| 221,620 | A | 11/1879 | Sikes |
| D22,206 | S | 2/1893 | Smith |
| 510,524 | A | 12/1893 | Smith |

(Continued)

FOREIGN PATENT DOCUMENTS

| CA | 1135509 A | 11/1982 |
| CA | 2096865 A1 | 11/1994 |

(Continued)

*Primary Examiner* — Monica L Barlow
*Assistant Examiner* — Aaron M Rodziwicz

(57) ABSTRACT

A plant support system includes a support ring having at least one wall portion, and at least one support beam coupled to the at least one wall portion and configured to increase rigidity of the at least one wall portion. Further, the plant support system also includes a base coupled to the at least one wall portion and having at least one stationary clamping surface; a clamp spine having a movable clamping surface situated opposite the at least one stationary clamping surface; and a plurality of spring leaves coupled to the clamp spine and configured to bias the clamp spine.

20 Claims, 35 Drawing Sheets

(56) References Cited

U.S. PATENT DOCUMENTS

| | | |
|---|---|---|
| 587,581 A | 8/1897 | Horan |
| 601,691 A | 4/1898 | Watson |
| 604,260 A | 5/1898 | Parker |
| 764,472 A | 7/1904 | Kessler |
| 836,328 A | 11/1906 | Maxfield |
| 870,864 A | 11/1907 | Barker |
| 871,901 A | 11/1907 | Walton |
| 997,022 A | 7/1911 | Tennant |
| 1,025,311 A | 5/1912 | Rowell |
| 1,359,388 A | 11/1920 | Koerner |
| 1,536,679 A | 5/1925 | Markowski |
| 1,556,373 A | 10/1925 | Thoeni |
| 1,560,404 A | 11/1925 | Brown |
| 1,587,740 A | 6/1926 | Wiswell |
| 1,594,195 A | 7/1926 | Henderson |
| 1,627,495 A | 5/1927 | Effley |
| 1,635,071 A | 7/1927 | Comstock |
| 1,898,164 A | 2/1933 | Bauer |
| 1,932,790 A | 10/1933 | Lein |
| 1,933,218 A | 10/1933 | Miller |
| 2,009,668 A | 7/1935 | Lay |
| 2,009,867 A | 7/1935 | Ball |
| 2,016,732 A | 10/1935 | Thompson |
| 2,530,015 A | 11/1950 | Kouri |
| 2,618,902 A | 11/1952 | Prescott |
| 2,763,096 A | 9/1956 | Roger |
| 2,764,846 A | 10/1956 | Worthington |
| 2,906,062 A | 9/1959 | Hohenfeldt |
| 3,026,649 A | 3/1962 | Barakauskas |
| 3,061,976 A | 11/1962 | Carroll et al. |
| 3,105,327 A | 10/1963 | Gasper |
| 3,264,783 A | 8/1966 | Bayliss |
| 3,731,429 A | 5/1973 | Orthman |
| 3,778,929 A | 12/1973 | Pearson |
| 3,793,771 A | 2/1974 | Slaughter |
| 3,803,759 A | 4/1974 | Heinecke |
| 4,048,752 A | 9/1977 | Anderson |
| 4,096,662 A | 6/1978 | Anderson |
| 4,322,911 A | 4/1982 | Bach |
| 4,503,636 A | 3/1985 | Stuckey |
| 4,519,162 A | 5/1985 | Stuckey |
| 4,534,129 A | 8/1985 | Stuckey |
| 4,610,107 A | 9/1986 | Testa |
| 4,631,861 A | 12/1986 | Wuthrich |
| 4,677,788 A | 7/1987 | Mastandrea |
| 4,750,293 A | 6/1988 | Dyke |
| 4,841,670 A | 6/1989 | Bitter |
| 4,860,489 A | 8/1989 | Bork |
| 4,881,342 A | 11/1989 | Ferguson |
| 4,914,857 A | 4/1990 | Dodgen |
| 5,048,231 A | 9/1991 | Brown |
| 5,327,678 A | 7/1994 | Schweiker |
| 5,341,593 A | 8/1994 | Foreman |
| 5,440,834 A | 8/1995 | Kleinert |
| 5,456,044 A | 10/1995 | Parker et al. |
| 5,542,210 A | 8/1996 | Hupfl |
| 5,557,883 A | 9/1996 | Walker |
| 5,595,019 A | 1/1997 | Foreman |
| 5,640,802 A | 6/1997 | Elliott |
| 5,752,341 A | 5/1998 | Goldfarb |
| 6,000,172 A | 12/1999 | Ballarino |
| 6,065,899 A | 5/2000 | Adams et al. |
| 6,067,751 A * | 5/2000 | Payr .................. A01G 9/124 47/44 |
| 6,088,956 A | 7/2000 | Rocka |
| 6,209,258 B1 | 4/2001 | Schneider |
| 6,234,444 B1 | 5/2001 | Haddad |
| 6,254,049 B1 | 7/2001 | Goehly |
| 6,282,836 B1 | 9/2001 | Goode et al. |
| 6,349,502 B1 | 2/2002 | Fernandez |
| 6,370,820 B1 | 4/2002 | Moss |
| 6,378,245 B1 | 4/2002 | Summers |
| 6,385,901 B1 | 5/2002 | Wahlberg |
| 6,405,479 B1 | 6/2002 | Sherman |
| 6,453,606 B1 | 9/2002 | Shulman et al. |
| 6,487,816 B1 | 12/2002 | Wolter |
| 6,912,809 B2 | 7/2005 | Malofsky et al. |
| 6,922,943 B1 | 8/2005 | Paille et al. |
| 6,938,370 B2 | 9/2005 | Johns |
| 6,964,126 B1 | 11/2005 | Anderson |
| 6,983,561 B2 | 1/2006 | Warren |
| 7,017,299 B1 | 3/2006 | Speed et al. |
| 7,043,876 B2 | 5/2006 | Lapelusa |
| 7,188,448 B2 | 3/2007 | Sedlacek |
| 7,249,439 B2 | 7/2007 | Pierce |
| 7,281,352 B2 | 10/2007 | Peck |
| 7,735,259 B2 | 6/2010 | Rich et al. |
| 7,774,977 B2 | 8/2010 | Miller Shelton |
| 7,810,276 B2 | 10/2010 | Rosaen |
| 7,874,100 B2 | 1/2011 | Miller |
| 7,918,051 B2 | 4/2011 | Early |
| 3,006,433 A1 | 8/2011 | Bryanton |
| 8,006,433 B1 | 8/2011 | Bryanton |
| 8,201,783 B1 | 6/2012 | Bamburg, Jr. |
| 8,474,178 B2 | 7/2013 | Kassouni |
| 8,499,492 B2 | 8/2013 | Kassouni |
| 8,567,120 B2 | 10/2013 | Davis et al. |
| 8,813,422 B1 | 8/2014 | Laudenklos |
| 8,857,103 B1 | 10/2014 | Coon |
| 9,167,755 B1 | 10/2015 | Kampman |
| 9,265,202 B2 | 2/2016 | Falk |
| 2004/0093792 A1 | 5/2004 | Avery |
| 2005/0102894 A1 | 5/2005 | Jocelyn |
| 2007/0062108 A1 * | 3/2007 | Wilbanks, Jr. .......... A01G 9/12 47/45 |
| 2007/0062109 A1 | 3/2007 | Jolley |
| 2007/0289210 A1 | 12/2007 | Gray |
| 2008/0028677 A1 | 2/2008 | Shelton |
| 2008/0190019 A1 | 8/2008 | Hart |
| 2008/0313960 A1 | 12/2008 | Norvitch |
| 2011/0047871 A1 | 3/2011 | Bowerman |
| 2011/0197505 A1 | 8/2011 | Hansen |
| 2011/0308151 A1 * | 12/2011 | Wu .................... A01G 9/12 47/46 |
| 2012/0055083 A1 * | 3/2012 | Marquez ............. A01G 9/12 47/45 |
| 2013/0139434 A1 * | 6/2013 | Warren ............... A01G 9/12 47/44 |
| 2014/0196365 A1 | 7/2014 | Washington |
| 2014/0305040 A1 | 10/2014 | Hall |
| 2015/0059241 A1 | 3/2015 | Montagano |
| 2015/0101248 A1 | 4/2015 | Adkinson |
| 2015/0289454 A1 | 10/2015 | Legus et al. |
| 2016/0135386 A1 | 5/2016 | Merz |
| 2016/0249536 A1 | 9/2016 | Mermelstein |
| 2016/0302366 A1 * | 10/2016 | Shadowshot .......... A01G 9/128 |
| 2018/0192595 A1 * | 7/2018 | Derrett ................ A01G 17/10 |

FOREIGN PATENT DOCUMENTS

| | | | |
|---|---|---|---|
| CA | 2121169 A1 | 10/1995 | |
| CA | 2123975 A1 | 11/1995 | |
| DE | 1094519 B | 3/1958 | |
| DE | 202014102092 U1 * | 8/2015 | ............ A01G 9/124 |
| EP | 0979601 A1 | 2/2000 | |
| EP | 2801250 A2 * | 11/2014 | ............... A01G 9/12 |
| GB | 1273231 A | 5/1972 | |

* cited by examiner

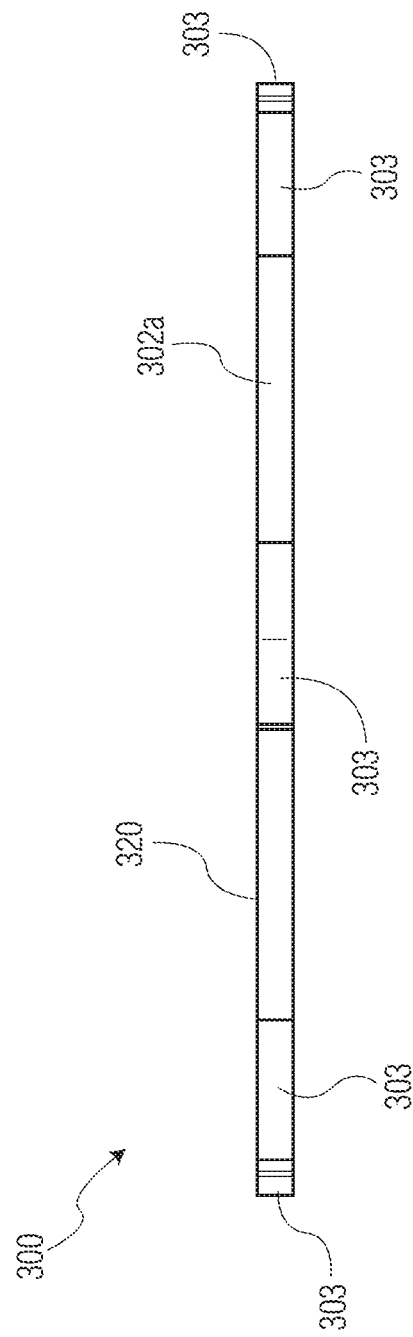

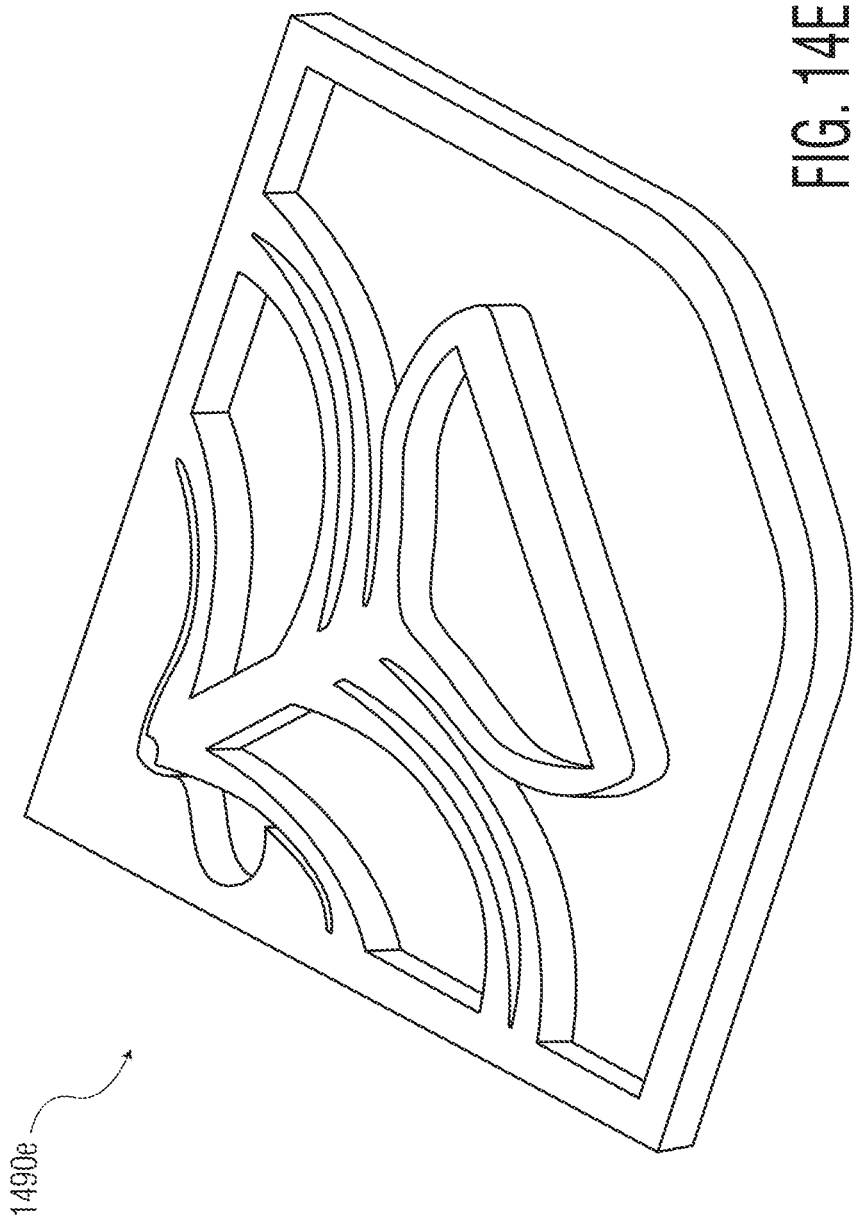

PLANT SUPPORT AND TRAINING SYSTEM AND METHOD OF OPERATION THEREOF

This application is the U.S. National Phase application under 35 U.S.C. § 371 of International Application No. PCT/US2018/023024 filed on Mar. 16, 2018, which claims the benefits of U.S. Provisional Patent Application Ser. No. 62/472,378, filed Mar. 16, 2017, which is incorporated herein by reference in its entirety.

The present system relates to a system to support portions of plants such as their limbs, flowers, fruit, seeds and the like and, more particularly, to a system to support and locate plant limbs in discrete locations to control growth of the plant limbs, increase yield, and enhance aesthetics, and methods of operation thereof.

Many plants such as vegetables and bushes (e.g., tomatoes, peppers, etc.) may lack the strength to be self-supportive and, therefore, must be supported using conventional trellises, cages (e.g., tomato cages, etc.), or the like to prevent damage to the respective plant. Further, other plants (e.g., roses, etc.) may grow in a disorderly manner and may require trellises for aesthetic arrangement. Although conventional trellises and cages can be used to support the plants, the plants must be attached to the trellises or cages using twine or twist-ties which can be time consuming, cumbersome, and inconvenient to a grower of the plants. Further, the height of horizontal members of traditional trellises and cages cannot be easily changed as the plant grows which can damage a plant and cause aesthetic issues. Moreover, support systems using metal-type screw-type clamps may seize due to dirt, rust, etc. especially when subject to an outdoor environment. Accordingly, embodiments of the present system may overcome these and other disadvantages of conventional plant support systems and methods.

The system(s), device(s), method(s), arrangements(s), user interface(s), computer program(s), processes, etc. (hereinafter each of which will be referred to as system, unless the context indicates otherwise), described herein address problems in prior art systems. Embodiments of the present system may provide a system and method for plant support have many advantages, including but not limited to, providing for fast easy one-handed or two-handed operation and being easily repositioned as plants grow, supporting all sides of plant without multiple stakes, keeping plants and/or branches substantially separated and individually movable thus allowable substantially all areas of plants be accessible for pruning and harvesting fruit. In addition, the various embodiments are reusable, small and light, easy to carry and store, do not rust and do not restrict movement of (potted) plants.

In accordance with embodiments of the present system, there is disclosed a plant support system, comprising a support ring having at least one wall portion; at least one support beam coupled to the at least one wall portion and configured to increase rigidity of the at least one wall portion; a base coupled to the at least one wall portion and having at least one stationary clamping surface; a clamp spine having a movable clamping surface situated opposite the at least one stationary clamping surface; and a biasing mechanism including a plurality of spring leaves coupled to the clamp spine and configured to bias the clamp spine. The plurality of spring leaves are arranged to provide for freedom of motion of the clamp spine to a direction which is substantially parallel to a plane of the support ring. Further, the plurality of spring leaves are arranged to reduce freedom of motion of the clamp spine in a direction which is substantially normal to a plane of the support ring.

The plant support system further comprises at least one receiving anchor coupled to the support ring and a handle coupled to the clamp spine, where the at least one receiving anchor further comprises at least one lock tab. The plant support system also comprises a handle coupled to the clamp spine, an extension limiter coupled to the handle, and a travel limiter to limit displacement of the clamp spine, where the travel limiter contacts a portion of the support ring at maximum displacement of the travel limiter.

In accordance with further embodiments of the present system, there is disclosed a method for forming a plant support, the method controlled by at least one controller, the method comprising the acts of obtaining material; and forming from the material a planar plant support, where the planar plant support comprises a support ring having at least one wall portion; at least one support beam coupled to the at least one wall portion and configured to increase rigidity of the at least one wall portion; a base coupled to the at least one wall portion and having at least one stationary clamping surface; a clamp spine having a movable clamping surface situated opposite the at least one stationary clamping surface; and a plurality of spring leaves coupled to the clamp spine and configured to bias the clamp spine, all formed integrally with each other. The method further comprises the act of attaching the planer plant support to a vertical column support.

In accordance with further embodiments of the present system, there is disclosed a plant support system, comprising a peripheral support ring having at least one wall portion; and a coupler coupled to the at least one wall portion, the coupler being configured to grip a column support and fix a relative position of the system with respect to the column support; where the coupler includes at least one flexible member configured to apply a mechanical force to the column support and maintain constant the relative position. The peripheral support ring and the coupler may be integral part of a flexible material, such as manufactured as one continuous piece of homogenous material sufficiently flexible to facilitate movement and articulation of at least the coupler. The cross-sectional thickness of at least one portion of the coupler is varied to change a local rigidity of the coupler to form structures such as at least one spring leave and/or self-hinges. Further, the at least one flexible member includes at least one spring leave configured to provide a biasing force to grip the column support. The plant support system further comprising at least one support beam that couples the coupler to the at least one wall portion of the peripheral support ring and is configured to increase rigidity of the at least one wall portion. In addition, a handle is coupled to a clamp spine, where the handle and the clamp spine are coupled to the flexible member of the coupler. The handle may be located at one end of the clamp spine near a gripping wall portion of the peripheral support ring, where the handle and the gripping wall portion are configured to be gripped by a single hand of a user to facilitate a single-handed positioning of the plant support system and a single-handed articulation, e.g., a single-handed movement back and forth, of the coupler to open and close a clamping pair of the coupler to receive the column support in the open position and grip the column support in the closed position, by squeezing the handle against the gripping wall portion of the peripheral support ring. The handle may be located a predetermined distance from the gripping wall portion to limit travel of the coupler.

Further, the at least one flexible member includes a plurality of spring leaves configured to provide a biasing force to grip the column support, where the plurality of spring leaves is configured to provide for a freedom of motion of the clamp spine in a direction which is substantially parallel to a plane of the peripheral support ring including limiting the freedom of motion of the clamp spine to the direction which is substantially parallel to a plane of the peripheral support ring. The at least one flexible member includes a plurality of spring leaves configured to provide a biasing force to grip the column support, where the plurality of spring leaves is configured to reduce a freedom of motion of the clamp spine in a direction which is substantially normal to a plane of the peripheral support ring. The peripheral support ring may form a circular, a square, or a polygonal shape. Further, the peripheral support ring may be discontinuous having one or more openings.

In accordance with further embodiments of the present system, there is disclosed a plant support system, comprising a peripheral support ring having at least one wall portion; at least one receiving anchor coupled to the peripheral support ring; and a coupler coupled to the at least one wall portion. The coupler may be configured to grip a column support and fix, or maintain constant, a relative position of the system with respect to the column support. The coupler may include at least one flexible member configured to apply a mechanical force to the column support and maintain constant the relative position. The at least one receiving anchor comprises at least one lock tab, where a profile at least one receiving anchor is contoured to receive and secure a portion of a plant, e.g., a stalk, a branch, a flower or fruit of the plant supported by the plant support system. The peripheral support ring, the at least one receiving anchor, and the coupler may be integral parts of a flexible material sufficiently flexible to facilitate articulation of at least the coupler and the at least one receiving anchor. The cross-sectional thickness of at least one portion of the coupler is varied to change a local rigidity of the coupler to form at least one spring leave. The plant support system further comprises at least one support beam that couples the coupler to the at least one wall portion of the peripheral support ring and is configured to increase rigidity of the at least one wall portion. Further, the peripheral support ring forms a circular, a square, or a polygonal shape. In addition or alternatively, the peripheral support ring may be discontinuous with one or more openings.

The present invention is explained in further detail in the following exemplary embodiments and with reference to the figures, where identical or similar elements are partly indicated by the same or similar reference numerals, and the features of various exemplary embodiments being combinable. In the drawings:

FIG. 3E shows a rear planar view of a portion of the support system of FIG. 3A in accordance with embodiments of the present system;

FIGS. 14A-14F show partially cutaway top front perspective views of a portion of different coupler carriers (CC) of a support system in accordance with embodiments of the present system;

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques, and methods are omitted so as not to obscure the description of the present system. It should be expressly understood that the drawings are included for illustrative purposes and do not represent the entire scope of the present system. In the accompanying drawings, like reference numbers in different drawings may designate similar elements. The term and/or and formatives thereof should be understood to mean that only one or more of the recited elements may need to be suitably present (e.g., only one recited element is present, two of the recited elements may be present, etc., up to all of the recited elements may be present) in a system in accordance with the claims recitation and in accordance with one or more embodiments of the present system.

Figure 1:
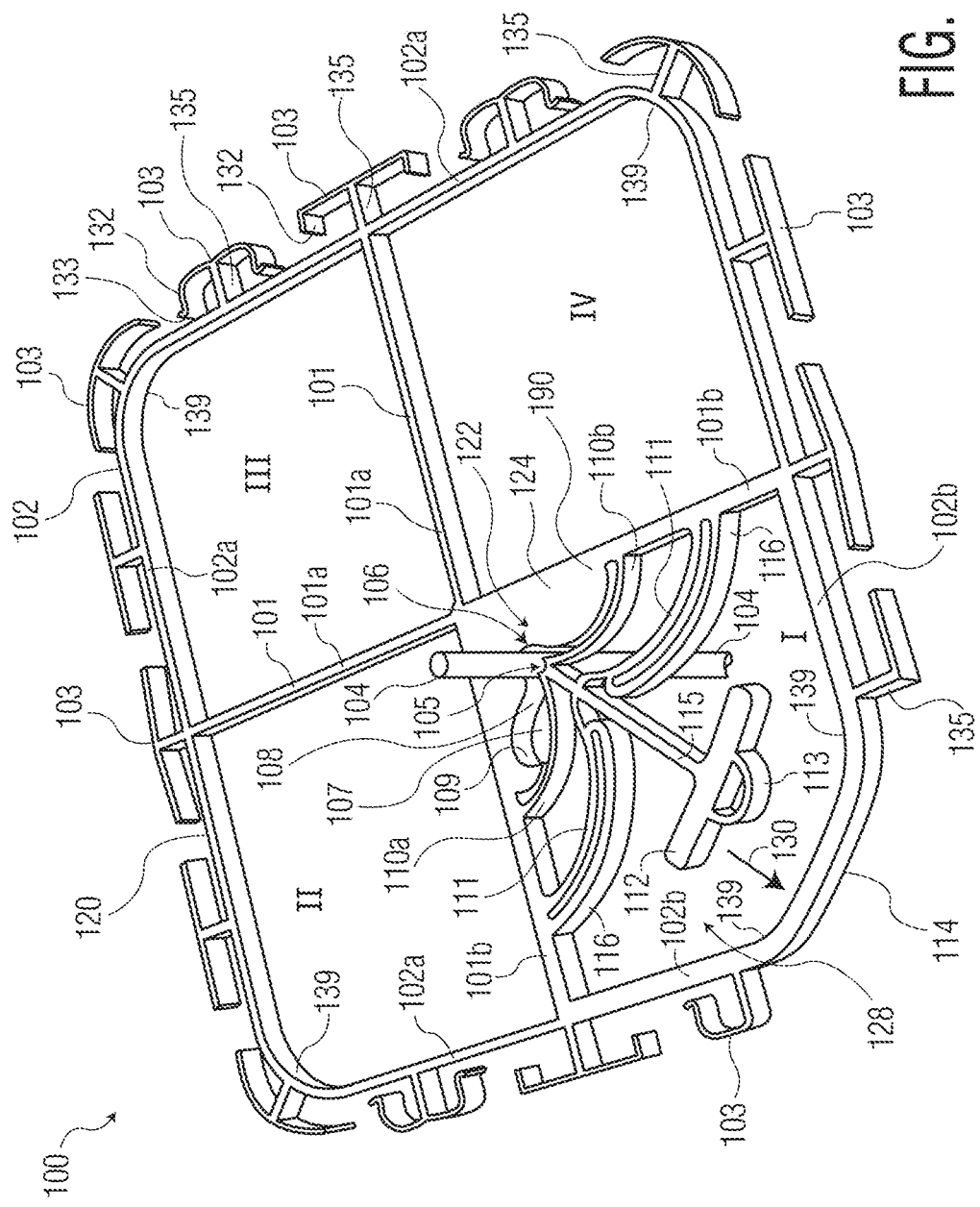
FIG. 1 shows a partially cutaway top front perspective view of a portion of a support system in accordance with embodiments of the present system.

FIG. 1 shows a partially cutaway top front perspective view of a portion of a support system 100 (hereinafter system 100 for the sake of clarity) in accordance with embodiments of the present system. The system 100 may include a support structure 120 having one or more of a base 124, one or more support rings 102, one or more support beams 101, and one or more couplers 122.

The base 124 may form at least part of the one or more couplers 122 and may be may be substantially centrally located within the one or more support rings 102 or may be offset to one or more sides relative to the one or more support rings 102. The base 124 may include a surface configured to form at least part of a stationary clamping surface 106 of the one or more couplers 122. A portion of a vertical column support (VCS) 104 is partially cutaway to better illustrate the clamping surface 106. The base 124 may further include at least one surface configured to define at least a portion of a column insertion channel backstop 109 and/or a column insertion channel ramp 108 which may be configured to position at least a portion of a VCS 104 when the VCS 104 is placed within an opening of the support system 100 such as during insertion/removal of the VCS 104, etc. Further, the base 124 may include at least one surface configured to define at least a portion of a column insertion channel 107 which may be situated proximate to the stationary clamping surface 106 and which may be configured to receive a column support such as the VCS 104. For example, at least a portion of the column insertion channel 107 may be defined by the column insertion channel ramp 108 and the column insertion channel backstop 109. The column insertion channel 107 and/or the stationary clamping surface 106 may be shaped and/or sized so as to correspond with a cross-sectional shape and size of the VCS 104 at a location where the one or more couplers 122 is in order to couple to the vertical column support 104. For example, assuming that the VCS 104 has a round cross section as shown, the column insertion channel 107 and/or the stationary clamping surface 106 may have corresponding curved and/or round shapes. In accordance with embodiments of the present system the VCS 104 may be a rod such as a plastic, fiberglass, carbon fiber, or steel rebar type rod and/or the like having ribs running along its length. However, in yet other embodiments, the VCS 104 may be formed from a natural material such as a piece of wood (e.g., a ½ by ½ inch stud, a bamboo stick, etc.), and/or a flexible material such as a rope, cable, or twine, etc. and may be oriented in any direction (e.g., vertical, horizontal, etc.).

The one or more support beams 101 may include support beams 101a and 101b which may extend radially or otherwise from the base 124 and which may be coupled to the support ring 102 at their respective proximal ends. Although, the support beams 101a and 101b may be situated in a plane, it is also envisioned that they may be staggered in different planes. Further, it is envisioned that the support beams 101a and 101b may be bifurcated along a length thereof so as to form a "Y" or other shape. Although four support beams (e.g., two each of 101a and 101b) are shown, it is envisioned that other numbers of support beams may be employed (e.g., 1, 2, 3, 4, 5, etc.). The support beams 101a and 101b may extend outward from the base 124 such that an angle between adjacent support beams 101a and 101b may be equal (e.g., substantially 90 degrees in the present embodiments) to each other or may be different from each other. For example, three support beams each separated by an equal angle from each other may extend radially from the base 124 and be coupled to the support ring 102 at their respective distal ends. However, in yet other embodiments, it is envisioned that the support rings may be situated asymmetrically relative to each other, the support structure 120, and/or the base 124.

In accordance with embodiments of the present system, the support beams 101 may form one or more closed areas such as quadrants I through IV each of which may include a clamping portion if desired.

The one or more couplers 122 and/or parts thereof may be integral with and/or coupled to the base 124 and may be configured to locate the support structure 120 in a desired position and/or orientation relative to a suitable support such as the VCS 104 (e.g., a support pole, taught rope, stake (e.g. wood, bamboo, etc.), rod (plastic, fiberglass, carbon fiber, etc.), trellis, cage, etc.). For the sake of clarity, the VCS 104 may be shown as a support pole situated in a vertical position. However, other positions (e.g., horizontal, etc.) for the VCS 104 and/or for the support structure 120 are also envisioned. For example, it is envisioned that the support structure 120 may be coupled to a support column situated in a horizontal or other orientation. Although the one or more couplers 122 are shown orientated in a plane of the support structure 120 substantially normal (90 degrees) relative to the VCS 104 at a point of coupling, in yet other embodiments, it is envisioned that the one or more couplers 122 may be configured to orient the support structure 120 at other angles such as 10, 20, 30, 45, 55, 60, 65, 70, 75 degrees, etc. The base 124 may include at least a portion of the one or more couplers 122. Further, that portion of the base 124 and the one or more couplers 122 may form a portion of a coupler carrier (CC) 190. Various coupling carriers may be substituted for one another as may be described elsewhere in this application, where any various structures of the various embodiments maybe combined to achieve to a suitable combination to provide a custom plant support.

With regard to the one or more couplers 122 (hereinafter coupler 122 for the sake of clarity), the coupler 122 may include a plurality of clamping surfaces such as the stationary clamping surface 106 and a movable clamping surface 105 that together form a clamping pair to accept (in the open position) and retain (in the closed or clamping position) the VCS 104. The movable clamping surface 105 may be configured to correspond with a shape and/or size of the VCS 104 and may be coupled to a clamp spine or spine 115. For example, the movable clamping surface 105 may have a "V"-shaped surface so as to accept the VCS 104 which may have a "V"-shaped cross section, or a different shaped cross section, such as a circular cross section or other curved, polygonal or stepped cross sectional shapes, such as C-shaped or open-ended octagonal-shaped cross sections, e.g., a half octagonal-shaped cross section, and the like. It is further envisioned that the "V"-shaped surface may be situated normal to a plane of the support structure 120. Similarly, a surface of the stationary clamping surface 106 may be situated normal to a plane of the support structure 120. In yet other embodiments, it is envisioned that the movable clamping surface 105 may have a surface of other shapes, such a partial circle or "C"-shaped surface so as to accept the VCS 104.

The one or more couplers 122 may further include a biasing member 128 (FIG. 2A) which may include one or more springs, such as leaf springs 110a, 110b, 111 and 116, which may be coupled to adjacent portions of the support beams 101 such as the support beams 101b. The leaf springs 110a, 110b, 111 and 116 may limit the degrees of freedom of travel of the clamp spine 115 and, thus, limit the degrees of freedom of travel of the moveable clamping surface 105. Ends of one or more of the leaf springs 116 and 111, distal to the adjoined support beams 101b, may be coupled to each other and thereafter to the clamp spine 115. The clamp spine 115 may form a portion of a movable clamping portion.

A handle 112 may be coupled to the clamp spine 115 and may be configured so as to be suitable for grasping by a user's hand so that a user may exert a force against the handle 112. The biasing members 128 may be coupled to the movable clamping surface 105 via the clamp spine 115 and may be configured to bias the clamping surface 105 in a desired position so that the VCS 104 may be coupled in position relative to the stationary clamping surface 106 and a movable clamping surface 105. An extension limiter 113 may be situated between the handle 112 and the support ring 102 and may be configured to contact an adjacent portion of the support ring 102 when one or more of the handle 112, the clamp spine 115 and/or the clamping surface 105 is displaced a sufficient amount in an open direction as indicted by arrow 130. Thus, the combination formed by the clamp spine 115, the handle 112, and/or the extension limiter 113 may act as a travel limiter which may prevent damage to the biasing members 128 during use. In accordance with some embodiments, the extension limiter 113 may be optional and the handle 112 may directly contact the adjacent portion of the support ring 102 (e.g., wall portion 114). A gap between the movable clamping surface 105 and the stationary clamping surface 106 may be referred to as an interstitial space.

The support ring 102 which may be coupled to distal ends of the support beams 101 such as the support beams 101a and 101b and may include one or more wall portions such as wall portions, 102a, 102b, and 114 such that wall portion 114 may be situated between wall portions 102b of the support ring 102. Similarly, wall portions 102b may be situated between wall portions 102a such that wall portions 102a may be situated adjacent to each other on at least one end. Sections between the plurality of wall portions (such as wall portions 102a, 102b, and 114) of the support ring 102 may filleted, chamfered and/or otherwise rounded if desired. Further, portions of the support ring 102 such as the wall portions 102a, 102b, and/or 114, the support beams 101a and/or 101b, and/or other portions and/or portions thereof, may include cross-sections which may be rectangular, square, round, and/or polygonal and/or other complex shapes such as a vertically-orientated, or horizontally-orientated I-beam shapes or the like. For example, "T," "J," "C," or other beam shapes may be used.

Wall portion 114 of the support ring 102 may be shaped and sized to be suitable for grasping by a user such as may occur when the user grasps the handle 112. Further, a thickness of the wall portion 114 may be increased relative to the other wall portions 102a and/or 102b such that wall portion 114 may function as a palm rest for a user's palm during use and may have minimal deflection during use. Wall portion 114 of the support ring 102 may be substantially parallel to the handle 112 and may be configured so as to act as a stop to limit travel of the extension limiter 113 as discussed above. Accordingly, the support ring 102 may have a generally square shape when viewed from above or below with rounded corners 139 and a chamfer at the wall portion 114.

The support ring 102 may include a plurality of receiving anchors 103 which may include a hook such as a "T"-shaped hook or tabs and/or the like and may be spaced at equal or non-equal distances from each other about a periphery of the support ring 102. The receiving anchors 103 may be shaped and sized similarly or different from each other and may be configured to couple to portions of plants such as their stems, fruits, and/or flowers so as to be configured to keep the coupled portion of the plant in a desired location, including spreading open a plant thus improving air movement and increasing light to inner branches. Further, the receiving anchors 103 may be shaped and sized to receive a desired plant. Thus, the receiving anchors 103 may keep plant stems, their fruit, and the like from slipping along or falling away from the support ring 102. It is further envisioned that one or more of the receiving anchors 103 may include a bent tab such as lock tab 132 which may be configured to prevent an attached portion of a plant from decoupling from the receiving anchor 103. In accordance with some embodiments the lock tab 132 may have a proximal end 133 which may be adjacent to the outer periphery of an adjacent portion of the support ring 102. This may provide a positive locking action to lock portions of the plant coupled thereto within an opening formed by the receiving anchor 103 and the corresponding portion of the support ring 102. The receiving anchors 103 may flex sufficiently to receive desired portions of plants and/or to release the desired portions of the plants under the control of a user. Accordingly, a user may grasp the corresponding receiving anchor 103 to force the receiving anchor 103 to flex sufficiently to attach a portion of a plant thereto and/or remove a portion of a plant attached thereto. The receiving anchors 103 may include a shaft portion 135 which may extend outwardly from an outer periphery of the support ring 102.

The support structure 120 or portions thereof may be formed using any suitable method such as 3D printing, extrusions, molding, casting, etc. and any suitable material such as a metal and/or polymer (e.g., plastic, rubber, wood, aluminum, carbon-fiber, fiber-reinforced plastic, etc.) and/or combinations of suitable materials. For example, in alternative embodiments, the support structure 120 may be formed from an extruded plastic and may include carbon-fiber biasing members.

The support structure 120 may be planar (e.g., when viewed from the side). It is also envisioned that the support structure 120 may also be non-planar, if desired. The support structure 120 may be configured to be stackable upon each other, if desired, so as to conserve space for storage and/or shipping.

Figure 2A:
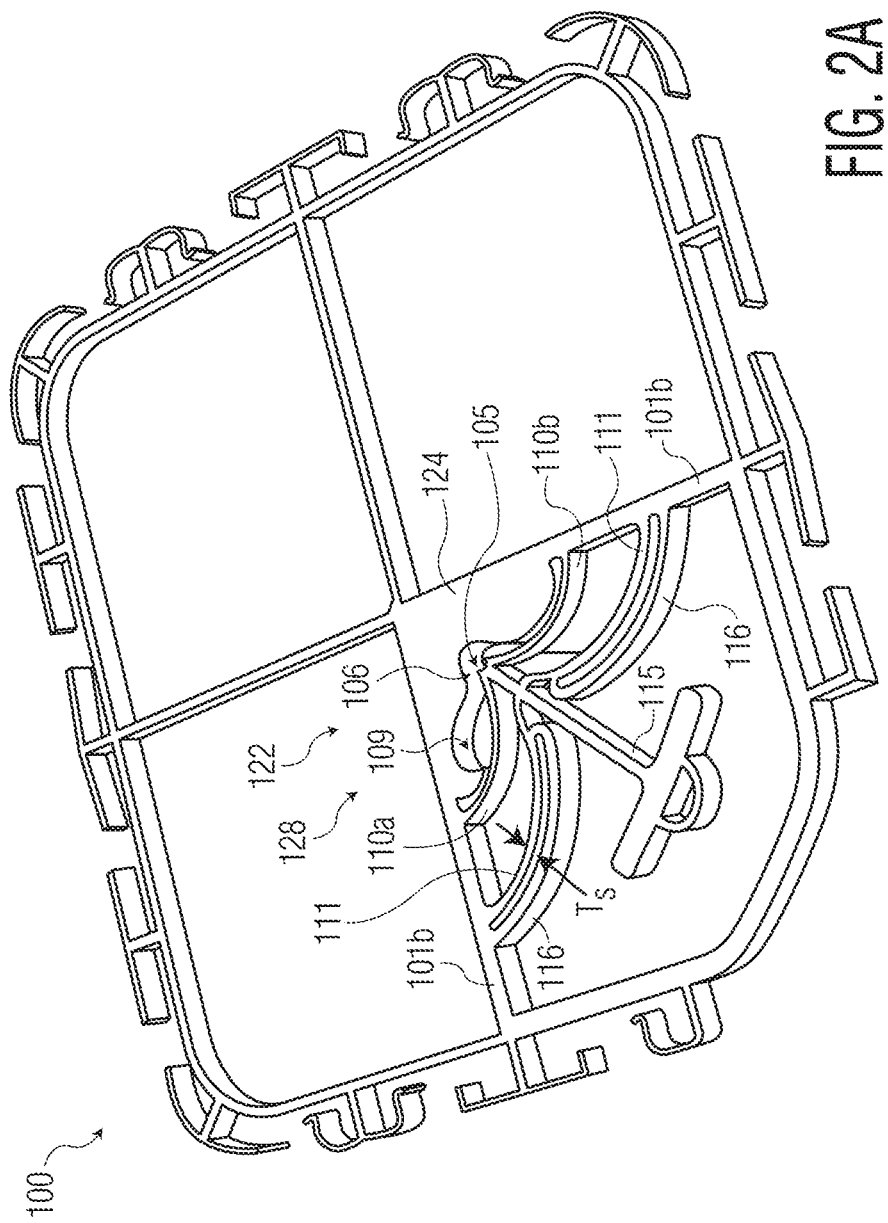
FIG. 2A shows a top front perspective view of a portion of the support system of FIG. 1 in accordance with embodiments of the present system.

FIG. 2A shows a top front perspective view of a portion of the support system 100 in accordance with embodiments of the present system. The stationary clamping surface 106 may be situated opposite the movable clamping surface 105. Each of the leaves 110a, 110b, 111 and 116 of the biasing member 128 of the one more couplers 122 may have a thickness $T_s$ which may be different and/or varied to adjust a spring constant $k_x$ of the corresponding leaf of the leaves 110a, 110b, 111 and 116. A bottom view may be similar.

The biasing members 128 may be coupled to the movable clamping surface 105 via the clamp spine 115 and may be configured to bias the movable clamping surface 105 in a desired position relative to the stationary clamping surface 106. By using two or more leaves 110a, 110b, 111, 116, the degrees of freedom of motion of the clamp spine 115 and, thus, the moveable clamping surface 105 relative to the stationary clamping surface 106 may be precisely controlled. This may enhance user convenience and a clamping power of the one or more couplers 122.

Figure 2B:
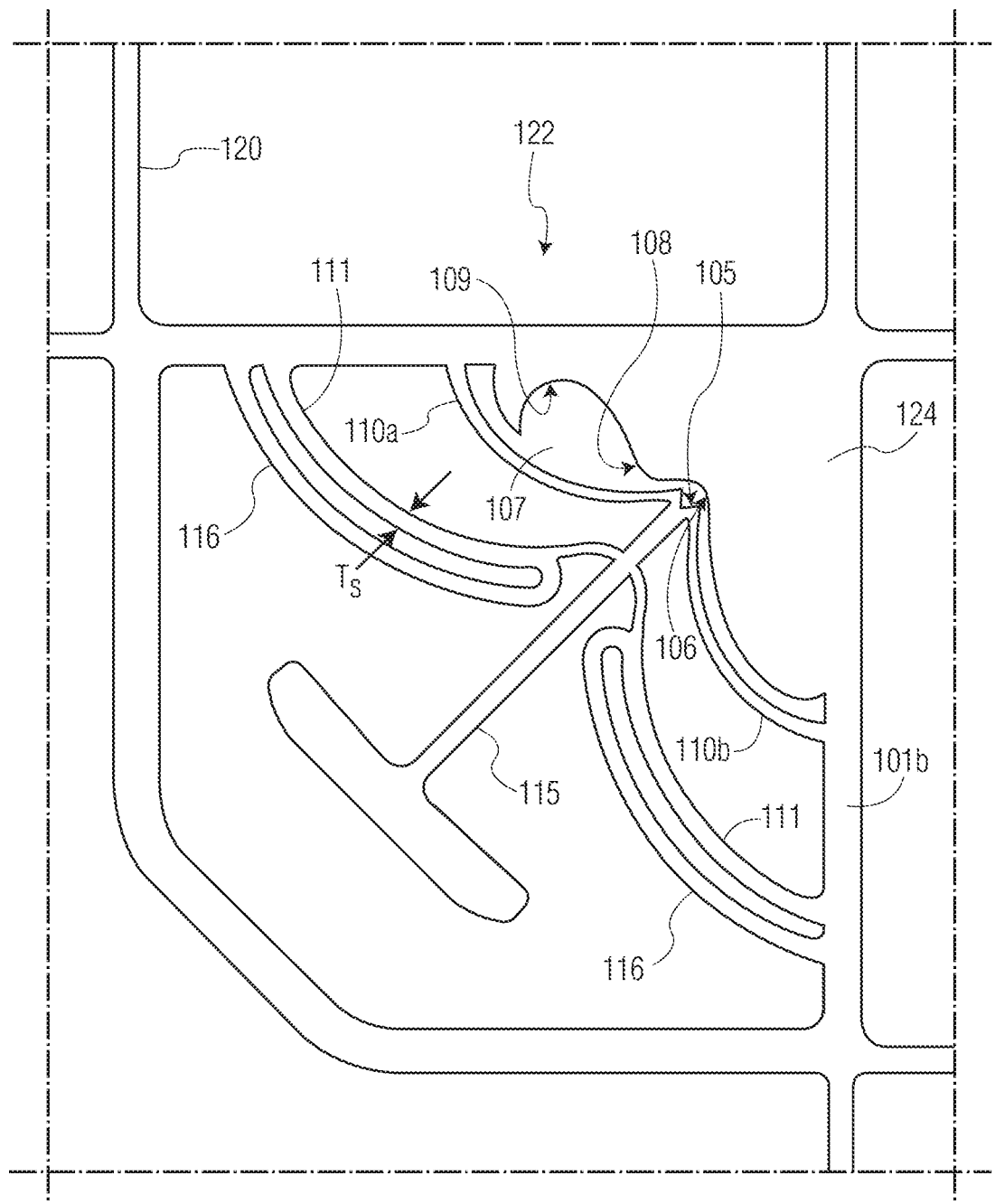
FIG. 2B shows a detailed top planar view of a portion of the portion of the support system of FIG. 1 in accordance with embodiments of the present system.

FIG. 2B shows a detailed top planar view of a portion of a portion of the support system 100 in accordance with embodiments of the present system. The stationary clamping surface 106 may be situated opposite the movable clamping surface 105, where a gap separates the stationary 106 and movable 105 clamping surfaces. Each of the leaves 110a, 110b, 111 and 116 of the biasing member 128 of the one more couplers 122 may have a thickness such as thickness $T_s$ (shown for leaf 111) which may be varied to adjust a spring constant $k_x$ of the corresponding leaf of the leaves 110a, 110b, 111 and 116. Although leaves of substantially equal thickness are shown, their thickness may vary as may be desired.

Figure 3A:
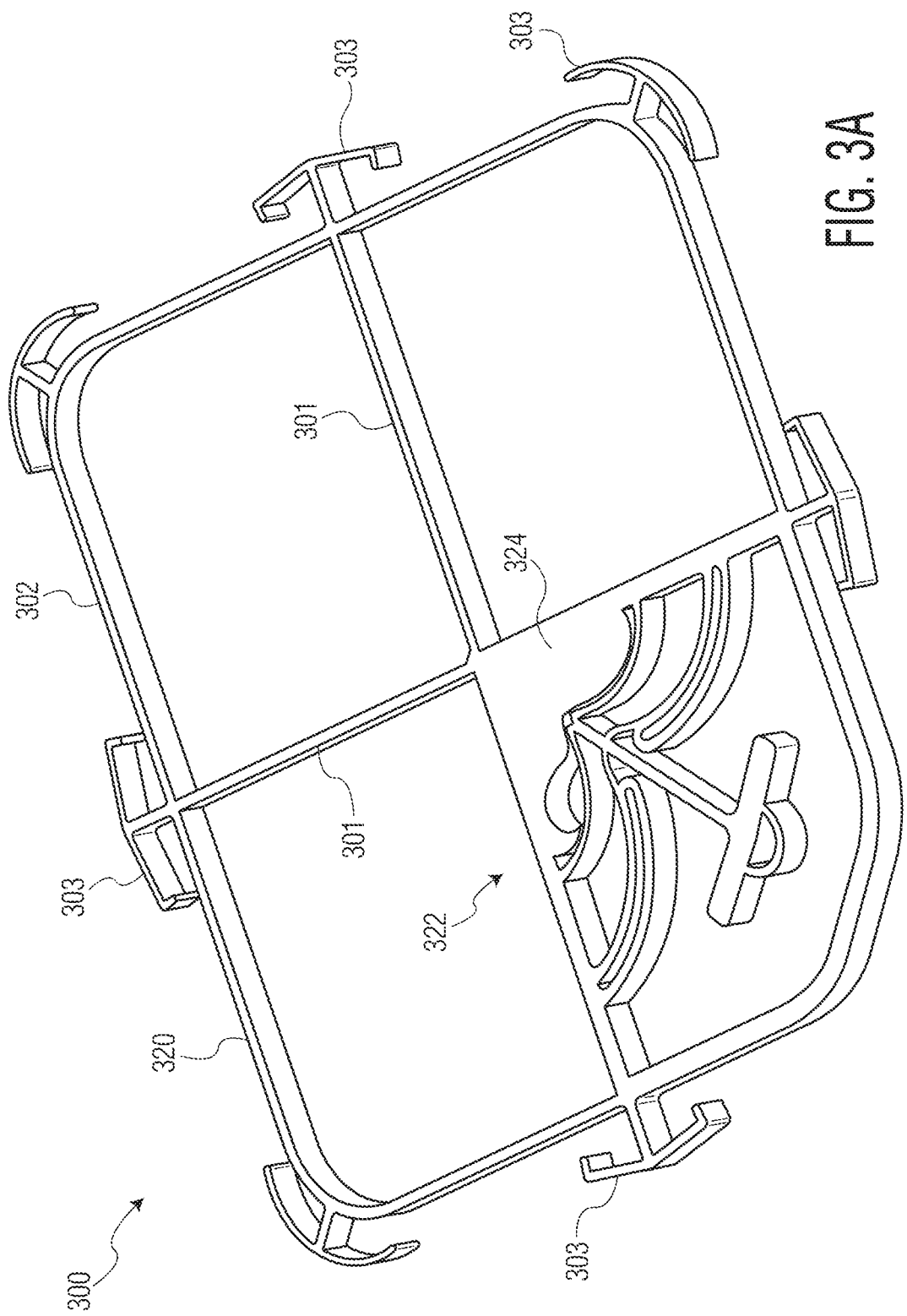
FIG. 3A shows a top front perspective view of a portion of a support system in accordance with further embodiments of the present system.
Figure 3B:
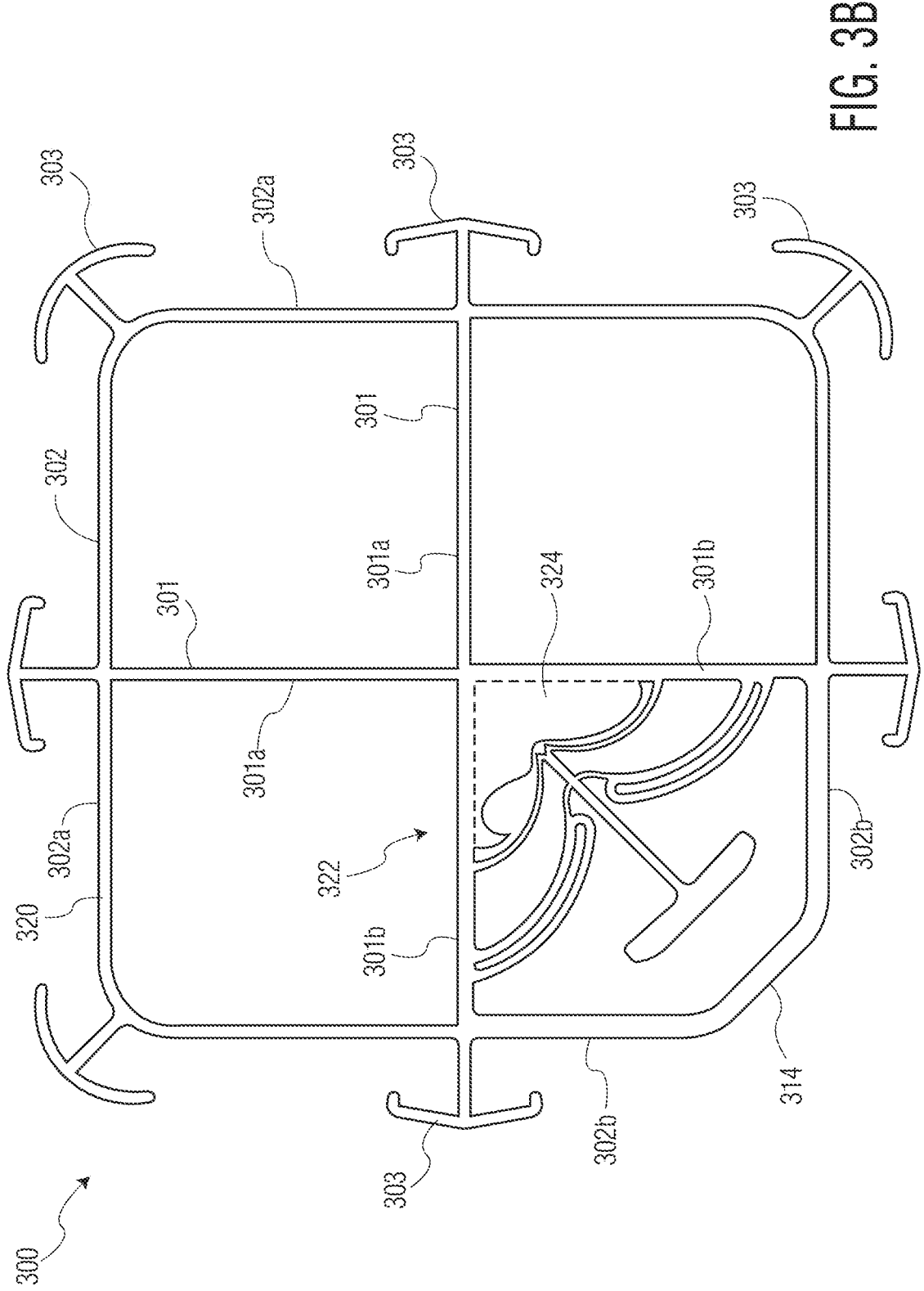
FIG. 3B shows a top planar view of a portion of the support system of FIG. 3A in accordance with embodiments of the present system.

FIG. 3A shows a top front perspective view of a portion of a support system 300 in accordance with embodiments of the present system. The support system 300 may be substantially similar to the support system 100 and may include a support structure 320 having one or more of a base 324, one or more support rings 302, one or more support beams 301, one or more couplers 322, and a plurality of receiving anchors 303. It is seen that the size, shape, position and number of receiving anchors 303 may be different from the receiving anchors 103 of the support system 100. FIG. 3B shows a top planar view of a portion of a support system 300 of FIG. 3A in accordance with embodiments of the present system. Support beams 301 may include support beams 301a and 301b (generally 301x). The support ring 302 may be coupled to distal ends of support beams 301x such as the support beams 301a and 301b. The support ring 302 may include one or more wall portions such as wall portions, 302a, 302b, and 314 such that wall portion 314 may be situated between wall portions 302b of the support ring 302.

Figure 3C:
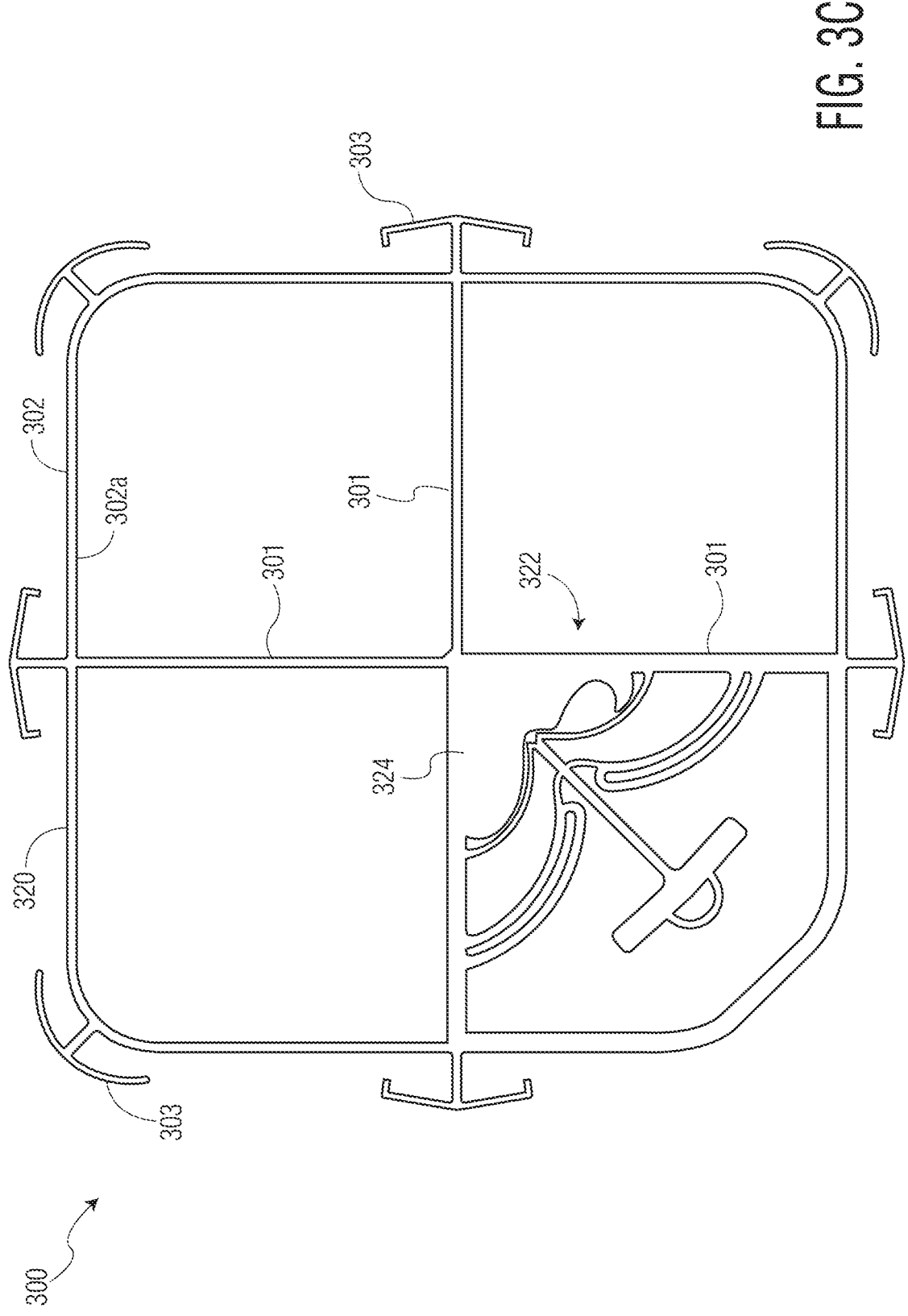
FIG. 3C shows a bottom planar view of a portion of the support system of FIG. 3A in accordance with embodiments of the present system.

FIG. 3C shows a bottom planar view of a portion of a support system 300 of FIG. 3A in accordance with embodiments of the present system.

Figure 3D:
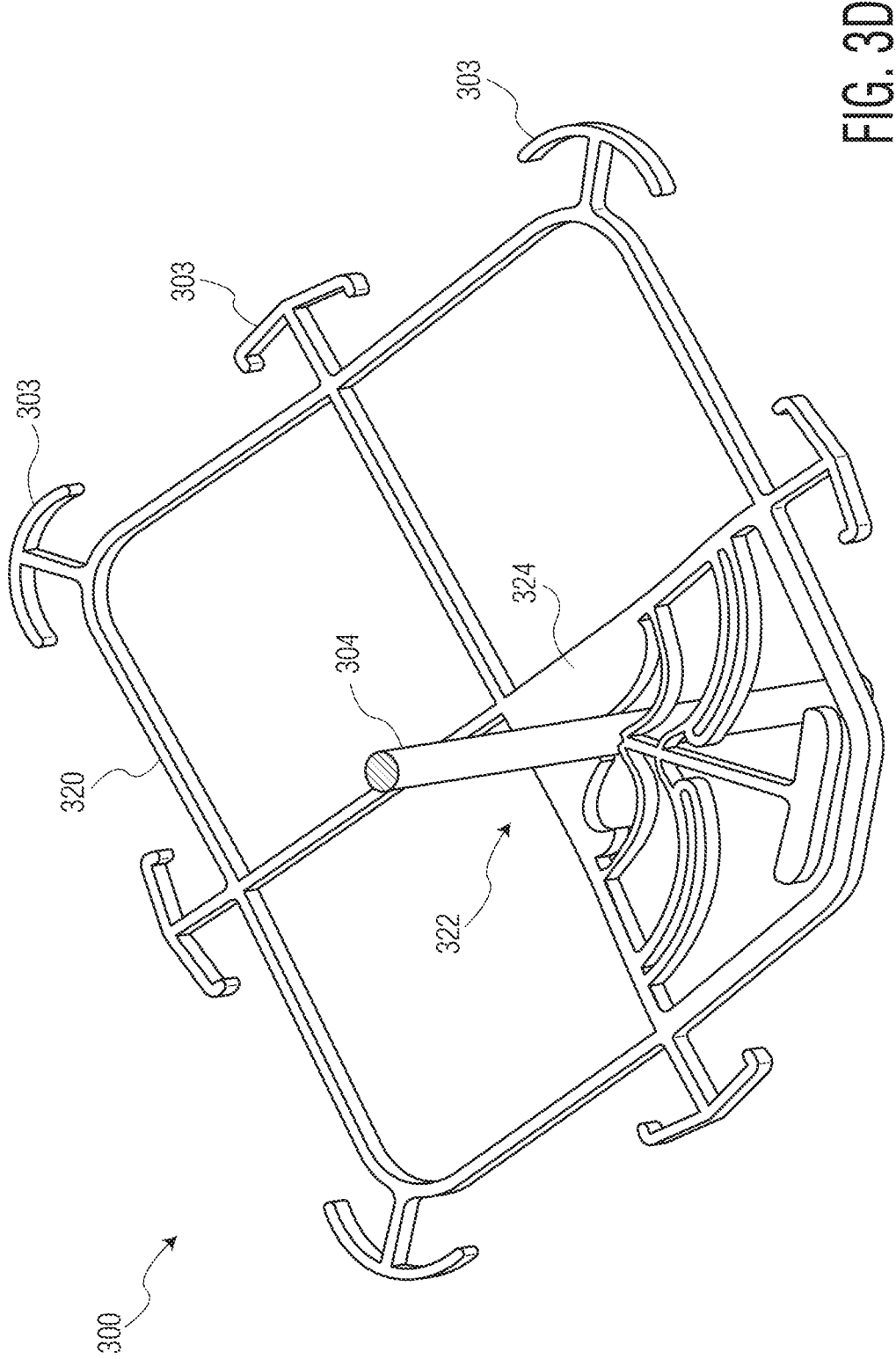
FIG. 3D shows a top front perspective view of a portion of the support system of FIG. 3A clamped to a vertical column support (VCS) in accordance with embodiments of the present system.

FIG. 3D shows a top front perspective view of a portion of a support system 300 of FIG. 3A clamped to a VCS in accordance with embodiments of the present system.

FIG. 3E shows a rear planar view of a portion of a support system of FIG. 3A in accordance with embodiments of the present system. By using a substantially planar design, the support system 300 may be stacked. This may be beneficial for storage, shipping, and handling.

Figure 4A:
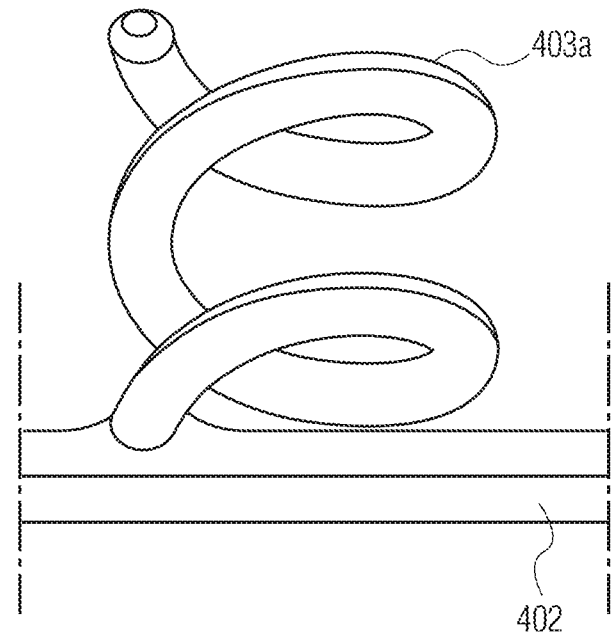
FIGS. 4A-4I show top planar views of a portion of various anchors in accordance with embodiments of the present system.
Figure 4B:
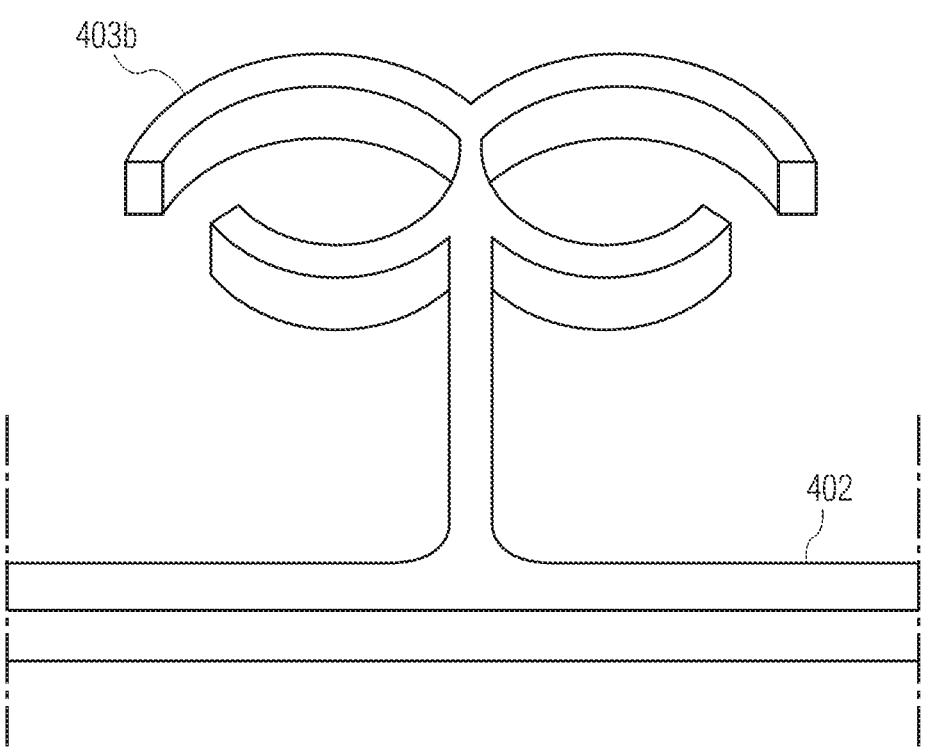
Figure 4C:
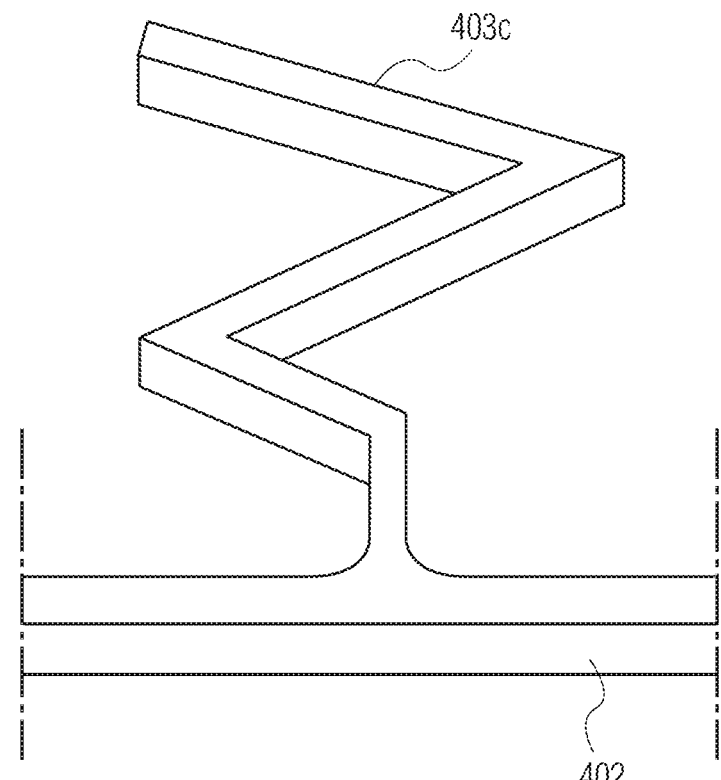
Figure 4D:
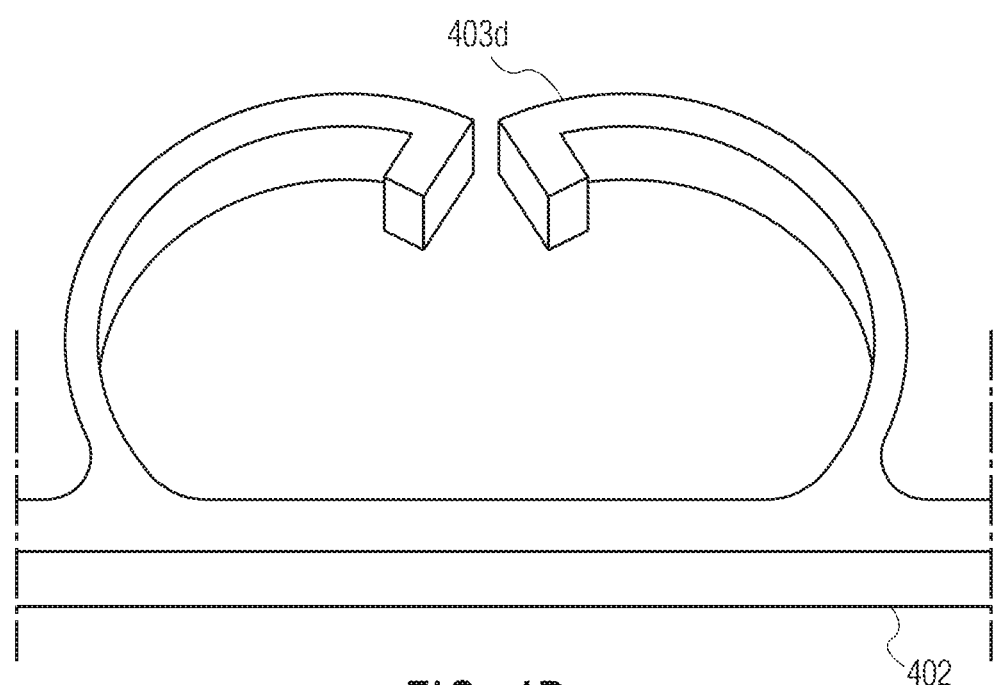
Figure 4E:
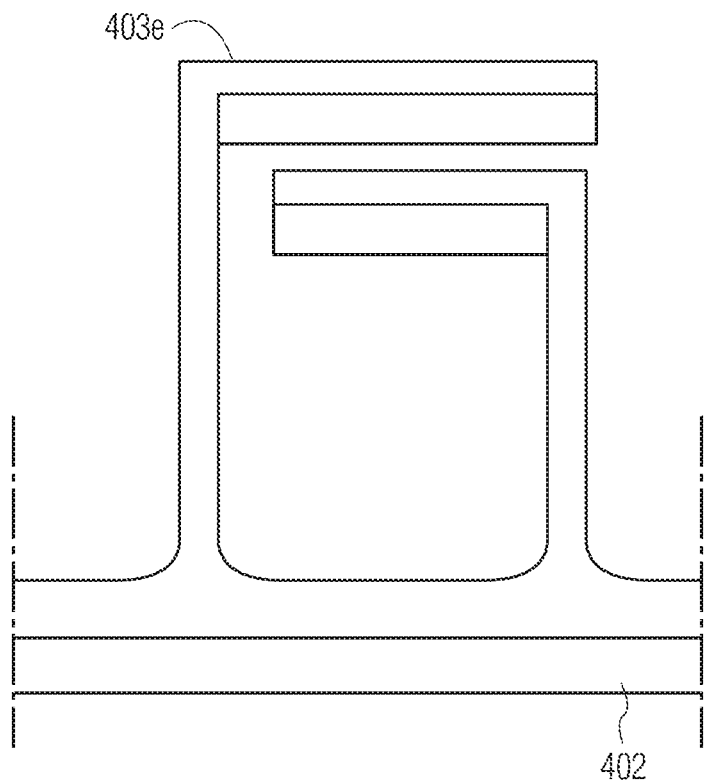
Figure 4F:
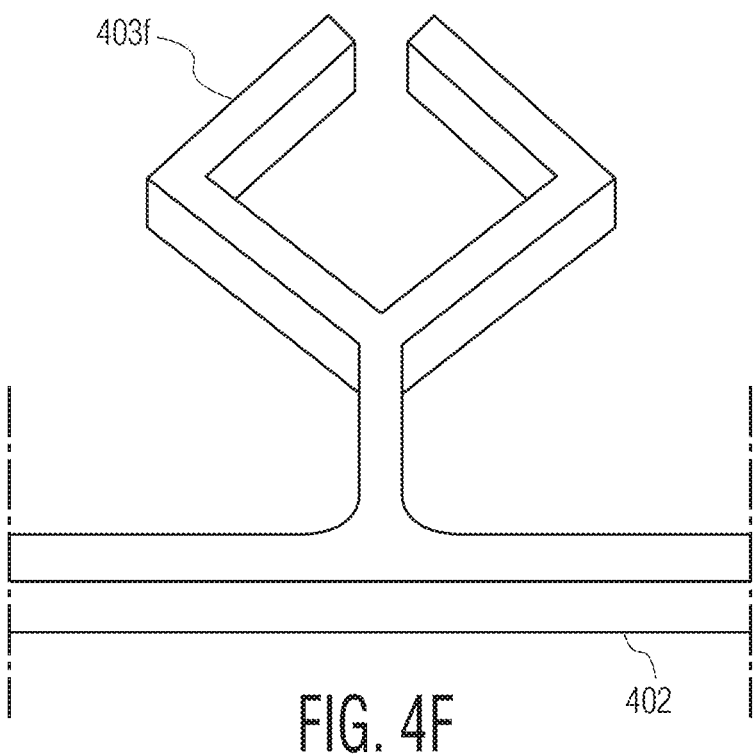
Figure 4G:
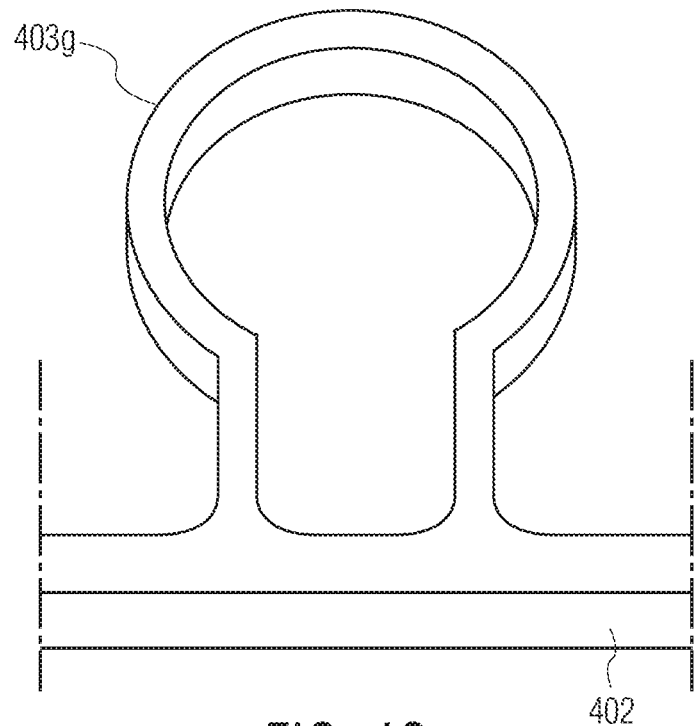
Figure 4H:
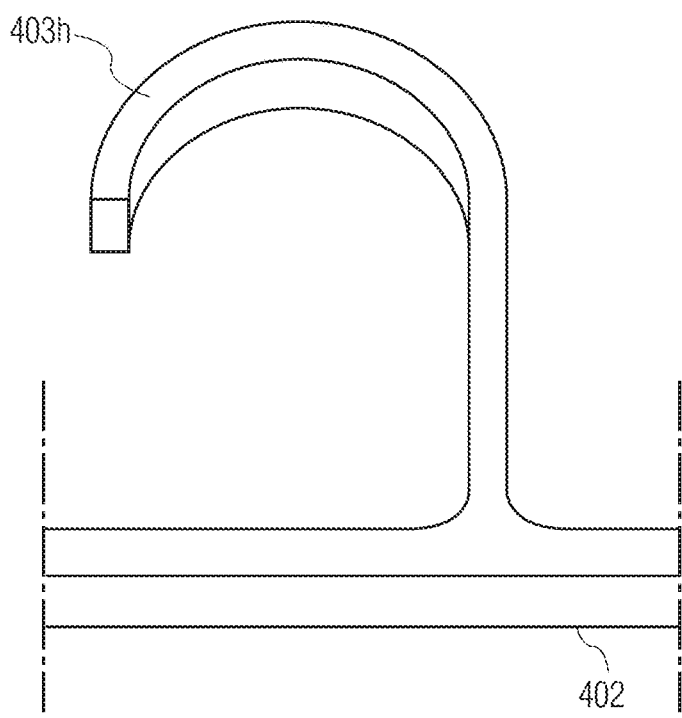
Figure 4I:
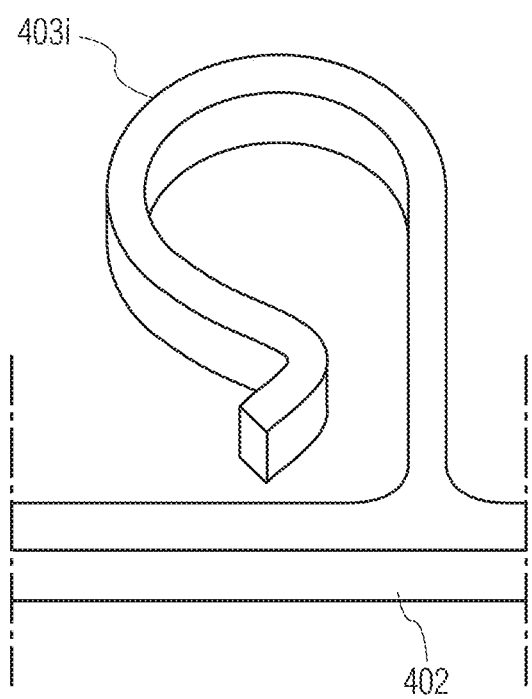

Alternative embodiments of receiving anchors 103 will now be shown and described with reference to FIGS. 4A through FIG. 4I, wherein FIG. 4A is a top planar view of a portion of an anchor 403A in accordance with embodiments of the present system; FIG. 4B is a top planar view of a portion of an anchor 403B in accordance with embodiments of the present system; FIG. 4C is a top planar view of a portion of an anchor 403C in accordance with embodiments of the present system; FIG. 4D is a top planar view of a portion of an anchor 403D in accordance with embodiments of the present system; FIG. 4E is a top planar view of a portion of an anchor 403E in accordance with embodiments of the present system; FIG. 4F is a top planar view of a portion of an anchor 403F in accordance with embodiments of the present system; and FIG. 4G is a top planar view of a portion of an anchor 403G in accordance with embodiments of the present system; FIG. 4H is a top planar view of a portion of an anchor 403H in accordance with embodiments of the present system; and FIG. 4I is a top planar view of a portion of an anchor 403I in accordance with embodiments of the present system.

While embodiments of the present system may be employed with any of the above-described or other anchors and/or combinations thereof, it should be understood that anchors of other shapes and/or sized may be employed with embodiments of the present system. In each of FIGS. 4A through 4I, the anchors 403A through 403I, respectively, are shown coupled to a portion of a support ring 402. It should be further understood that the anchors may be coupled to an interior or exterior periphery of a support ring such as the support ring 402.

Figure 5:
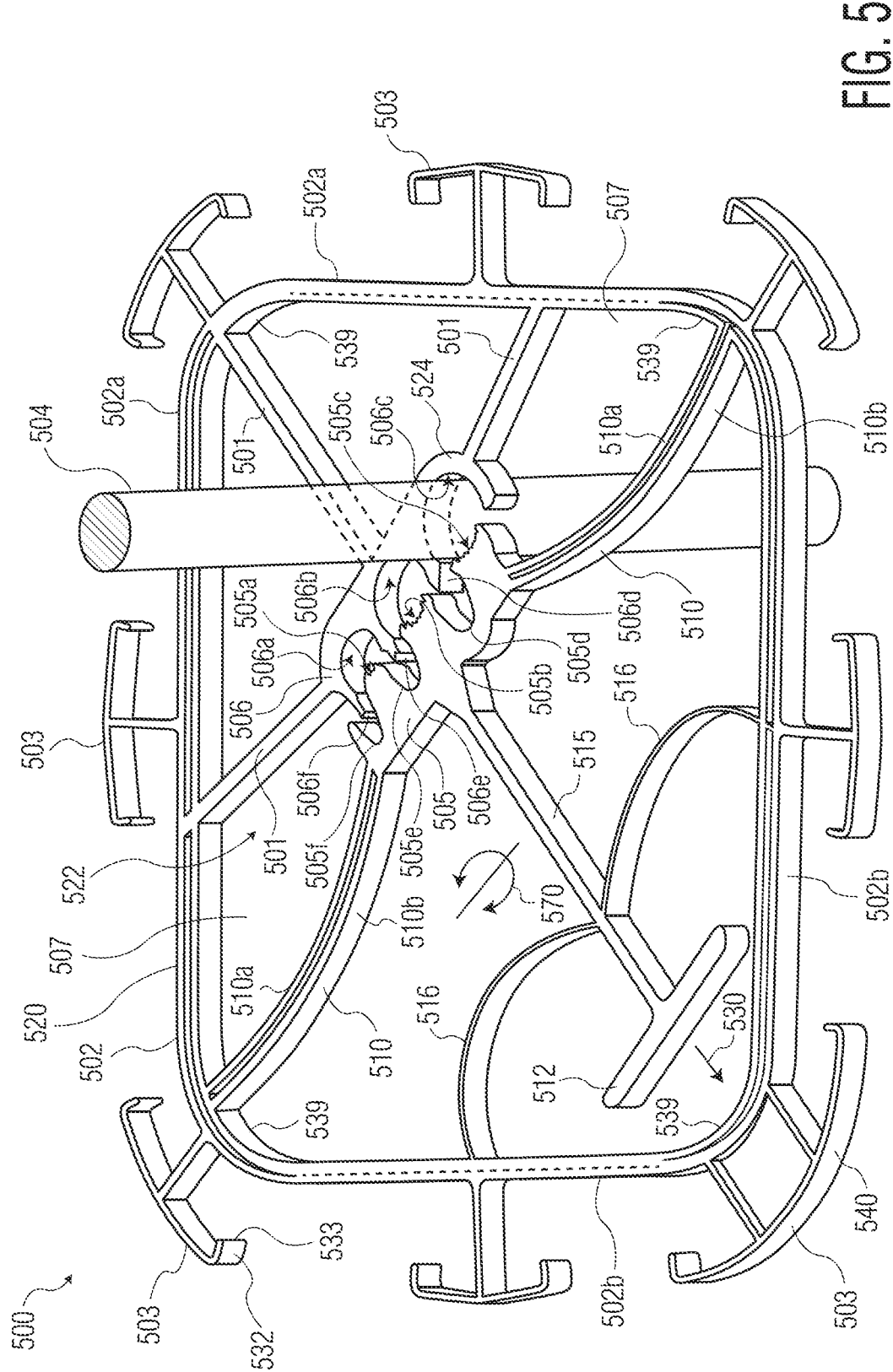
FIG. 5 shows a top front perspective view of a portion of a support system coupled to a VCS in accordance with further embodiments of the present system.

FIG. 5 shows a top front perspective view of a portion of a support system 500 (hereinafter system 500 for the sake of clarity) coupled to a VCS 504 in accordance with embodiments of the present system. The system 500 may include a support structure 520 having one or more of a base 524, a support beam 501, support ring 502, and a coupler 522. The support structure 520 may be planar or non-planar. Further, the support ring 502 may be continuous or discontinuous and may include a one or more of wall portions 502a through 502d (generally 502x) which may form a desired shape (e.g., substantially square in the present embodiments). However, it should be understood that the support structure 520 may be formed in other shapes such as round, rectangular, triangular and polygonal.

The support ring 502 may include a plurality of receiving anchors 503 which may include a hook such as a "T"-shaped hook or tabs and/or the like and may be spaced at equal or non-equal distances from each other about a periphery of the support ring 502. The receiving anchors 503 may be shaped and sized similarly or different from each other and may be configured to couple to portions of plants such as their stems, fruits, and/or flowers so as to keep the coupled portion of the plant in a desired location. Further, the receiving anchors 503 may be shaped and sized to receive a desired plant. Thus, the receiving anchors 503 may be configured to keep plant stems, their fruit, and the like from slipping along or falling away from the support ring 502. It is further envisioned that one or more of the receiving anchors 503 may include a bent tab such as lock tab 532 which may be configured to prevent an attached portion of a plant from decoupling from the receiving anchor 503. In accordance with some embodiments the lock tab 532 may have a proximal end 533 which may be adjacent to the outer periphery of an adjacent portion of the support ring 502. This may provide a positive locking action to lock portions of the plant coupled thereto within an opening formed by the receiving anchor 503 and the corresponding portion of the support ring 502. The receiving anchors 503 may flex sufficiently to receive desired portions of plants and/or to release the desired portions of the plants under the control of a user. Accordingly, a user may grasp the corresponding receiving anchor 503 to force the receiving anchor 503 to flex sufficiently to attach a portion of a plant thereto and/or remove a portion of a plant attached thereto.

The support beam 501 may extend between and adjacent (or opposite, if desired) wall portions 502a through 502b (generally 502x), such as wall portions 502a and 502b of the wall portion 502. The support beam 501 may function to receive a tensile load from the wall portions 502x coupled thereto when the one or more couplers 522 are opened. This may increase rigidity of the wall portion 502 and prevent excessive deformation of the wall portion 502 during use.

The base 524 may be coupled to, and/or formed integrally with the support beam 501. For example, the base 524 may extend along a length of the support beam 501. The base 524 may form at least part of the coupler 522 (e.g., a clamping mechanism) and may include a surface configured to form at least part of one or more stationary clamping surfaces 506a through 506f. Each of these clamping surfaces may be shaped and/or sized to correspond with a shape and/or a size of a cross-sectional of a vertical column support (which may be arranged in a vertical, horizontal, or other direction as may be desired) that may be inserted therein. In the present embodiments, the one or more stationary clamping surfaces 506a through 506f each correspond with vertical column supports of different diameters and the same cross-sectional shape (e.g., substantially round). However, it should be understood that the one or more stationary clamping surfaces 506a through 506f may each correspond with vertical column supports of different diameters and/or different cross-sectional shapes (e.g., square, rectangular, triangular, polygonal, etc.) as may be desired.

With regard to the coupler 522 (e.g., clamping mechanism), the coupler 522 may include one or more of a plurality of biasing members, a movable clamping portion 505, a clamp spine 515, and a handle 512.

The clamping portion 505 may include a plurality of clamping surfaces such as the stationary clamping surfaces 506a through 506f (generally 506x) and movable clamping surfaces 505a through 505f (generally 505x). The movable clamping surfaces 505x may be configured to correspond with a shape and/or size of a corresponding stationary clamping surface 506a through 506f, respectively such that they may correspond with a shape and/or size of a cross-section of a vertical support column (VCS) which they may receive. In the illustrative embodiment shown in FIG. 5, six different sized openings are provided by six clamping pairs 505x, 506x (i.e., x=6), to receive VCC(s) 504 of six different sizes and/or shapes. For example, each of the movable clamping surfaces 505a through 505f (e.g., clamping faces) may have a "V"-shaped surface or the like so as to be able to clamp to a vertical column support that it receives. It is further envisioned that the "V"-shaped surface may be situated normal to a plane of the support structure 520. Similarly, a surface of the stationary clamping surface 506 may be situated normal to a plane of the support structure 520. Each pair of corresponding clamping stationary clamping surfaces 506x and movable clamping surfaces 505x may form a clamping pair to accept (in the open position) and retain (in the closed or clamping position) one or more vertical support columns (VCSs). Alternatively or in addition, other embodiments may include stationary and movable clamping surfaces 505, 506 that have shapes other than a "V"-shaped surface or may have a combination of different-shaped surfaces including a partial circle or "C"-shaped surfaces, for example, so as to accept the VCSs of the same sizes and/or cross-sectional shapes. The stationary and movable clamping surfaces 505, 506 may have similar or complementary sizes and/or shapes, such as both clamping surfaces 505, 506 having a "V" or a "C" shape, for example. Alternatively or in addition, the stationary and movable clamping surfaces 505, 506 may have different sizes and/or shapes, where one may have "V"-shaped surface, while the other may have a "C"-shaped surface.

Portions of the clamping surfaces 506x and/or 505x may include ribs to increase clamping effectiveness when clamping a vertical column support. For example, portions of the clamping surfaces 506x and/or 505x may include vertical ribs and/or teeth which may concentrate pressure on the VCS 504 (e.g., a stake) to improve grip which may reduce or entirely prevent slippage between the portions of the clamping surfaces 506x and/or 505x and the VCS 504.

The clamp spine 515 may be coupled to the movable clamping portion 505 at a proximal end and to the handle 512 at its distal end. The handle 512 may be suitable for grasping by a user during use.

The biasing members may include a plurality of springs such as leaf springs 510 and 516. Leaf springs 510 may include one or more leaves such as parallel leaves 510A and 510B and may couple the movable clamping portion 505 to the support ring 502. The parallel leaves 510A and 510B may be separated by a larger gap or interconnected at desired intervals by cross members separated by smaller gaps, for example. Alternatively or in addition, the parallel leaves 510A and 510B may be an integral leaf spring(s), such as a single leaf spring having an H-cross section, for example. Leaf springs 516 may couple the clamp spine 515 to the support ring 502. Accordingly, the biasing members may bias one or more of the movable clamping portion 505 against a vertical column support when inserted within the clamping pair so as to clamp the VCS 504 in a substantially fixed position. A length of the handle 512 and/or the clamp spine 515 may be adjusted so as to limit travel of the handle 512. Thus, a position and of lengths of the handle 512 may be situated as at a distance relative to an adjacent portion of the support ring 502 so as to act as a travel limiter of the movable clamping portion 505. This may prevent or otherwise limit fatigue of the biasing members (e.g. leaf springs 510 and 516).

A gripping portion 540 may be configured so that it may be grasped by a user when grasping the handle 512. Thus, during use, a palm of a user's hand may be placed across the gripping portion 540 or the gripping surface 539 while the fingers of the user's same or other hand may be placed around the handle 512 for a one-handed or two-handed squeezing operation.

For example, a two-handed squeezing operation may be used to position the support system 500 at desired position, such as sliding it up and down the VCS 504. For a two-handed squeezing operation, the user may pull the handle 512 back with one hand while holding the gripping surface 539 with the other hand. In addition, the gripping surface 539 may be pushed the handle 512 in combination with the handle pulling action, for a two-handed a squeezing operation.

However, a one-handed squeezing operation may also be used to position the support system 500 at desired position and height, thus leaving the user with a free hand which may be used to grasp other portions of the support system 500, such as the support ring 502 or one of the receiving anchors 503, and/or the VCS 504, for example, to facilitate positioning the support system 500 at a desired location. For the one-handed squeezing, the palm of a user's hand is placed across the gripping portion 540 or the gripping surface 539 while the fingers of the user's same hand is placed around the handle 512. The user may then the user may curl the user's fingers causing a squeezing action which may displace the handle 512 (and attached clamp spine 515 and movable clamping portion 505) in a direction indicated by arrow 530 (e.g., substantially parallel to an x-y plane of the support system 500) thus opening the clamping pairs formed by the corresponding clamping stationary clamping surfaces 506x and movable clamping surfaces 505x. When the clamping pairs are opened, a vertical column support (VCS), which is inserted/located in the insertion channel 507, may be moved, e.g., by using the thumb of the free hand of the user to push the VCS towards the interstitial space between a clamping pair while placing the index finger against the base 524, and while squeezing the fingers of the other hand to move the handle 512 back towards the gripping portion 540 and open the at least one clamping pair of the clamping pairs. Accordingly, the VCS may be easily positioned within a clamping pair in the interstitial space, moved within a corresponding clamping pair to a desired height, and/or moved between different clamping pairs, such as moved from a first clamping pair to another or second clamping pair (e.g., to adjust for a cross-sectional size of the vertical column support). Thereafter, the user may release the squeeze and the plurality of biasing members (e.g., leaf springs 510, 516) may provide a biasing force to clamp the vertical column support with a corresponding clamping pair. One or more of the receiving anchors 503 may be coupled to the gripping portion 540 as may be desired. Accordingly, one of the receiving anchors 503, namely, the one coupled to the gripping portion 540 may, in addition to providing a surface for support of a plant portion, also provide additional or alternate surface for the user to grab and facilitate the squeezing action that displace the handle 512 away from the base 524 thus placing the clamping pair in the open position to accept or move a VCS.

Optional column insertion channels 507 may be configured to receive portions of the vertical column support prior to clamping and may be formed, at least in part, by one or more of the leaf springs 510 and the base 524. The insertion channels 507 may be shaped and sized to receive a desired VCS. In the closed or clamping position, the insertion channels 507 may have large openings which are larger than at least one of the openings formed by the clamping surfaces 506x and/or 505x, thus facilitating initial insertion of the VCS through one of the large openings formed by one of the insertion channels 507 even in the closed position of the clamping pair. The large opening of a channel 507 may be configured to be sized and shaped so as to accept a desired sized and shaped VCS while the clamping pair is in the closed or clamped position, i.e., without having to exert force to open or separate the clamping pair by squeezing the handle 512 towards the gripping surface 539 (of the support ring 502) that may be grasped by a user to transition to the open position. Once the VCS is inserted in the large opening of an insertion channel 507, then the clamping pair is transitioned from the closed to the open position by the squeezing, and the support system 500 is moved such that the VCS location is changed from being in the insertion channel 507 to being located in one of the clamping pairs formed by the corresponding clamping stationary clamping surfaces 506x and movable clamping surfaces 505x. Next, branches of the plant may be attached to corresponding receiving anchors 503.

In accordance with embodiments of the present system, two or more vertical column supports (VCSs) may be provided and clamped by corresponding clamp pairs to prevent or otherwise limit rotational motion of the support system 500 about a vertical axis which is normal to a plane of the support system 500 (e.g., yawing about a z axis).

Having the paired springs separated from each other, such as the leaf springs 510 and 516, prevents or reduces undesirable motion of the combination formed by the clamp spine 515, the handle 512, and the movable clamping portion 505. In other words, the leaf springs 510 may limit the degrees of freedom of travel of the clamp spine 515 and, thus, limit the degrees of freedom of travel of the moveable clamping surface 505 to travel within the plane of the support structure 520 (e.g., the x-y plane). Thus, the configuration of the leaves 516 and 510 may limit movable portions of the trellis (such as the movable clamping portion 505, the clamp spine 515 and the handle 512, etc.) from rotating about multiple axes, such as about an axis perpendicular to the clamp spine 515 inscribed in an x-y plane (e.g., corresponding with a plane of the a support structure 520) as illustrated by arrow 570. By increasing a distance between leaves 516 and leaves 510, a longer moment arm is created to prevent the above-described rotation. This may enhance user convenience, reduce or entirely eliminate fatigue of the leaves 516 and 510, and may enhance a grip by the moveable clamping portion 505 upon the VCS 504, including keeping the plant in place and not allow a plant portion to force the trellis out of the horizontal plane, such as when a heavy fruit is hanging from one of the anchors 503, such as the anchor(s) 503 near or at the gripping portion 540.

Figure 6:
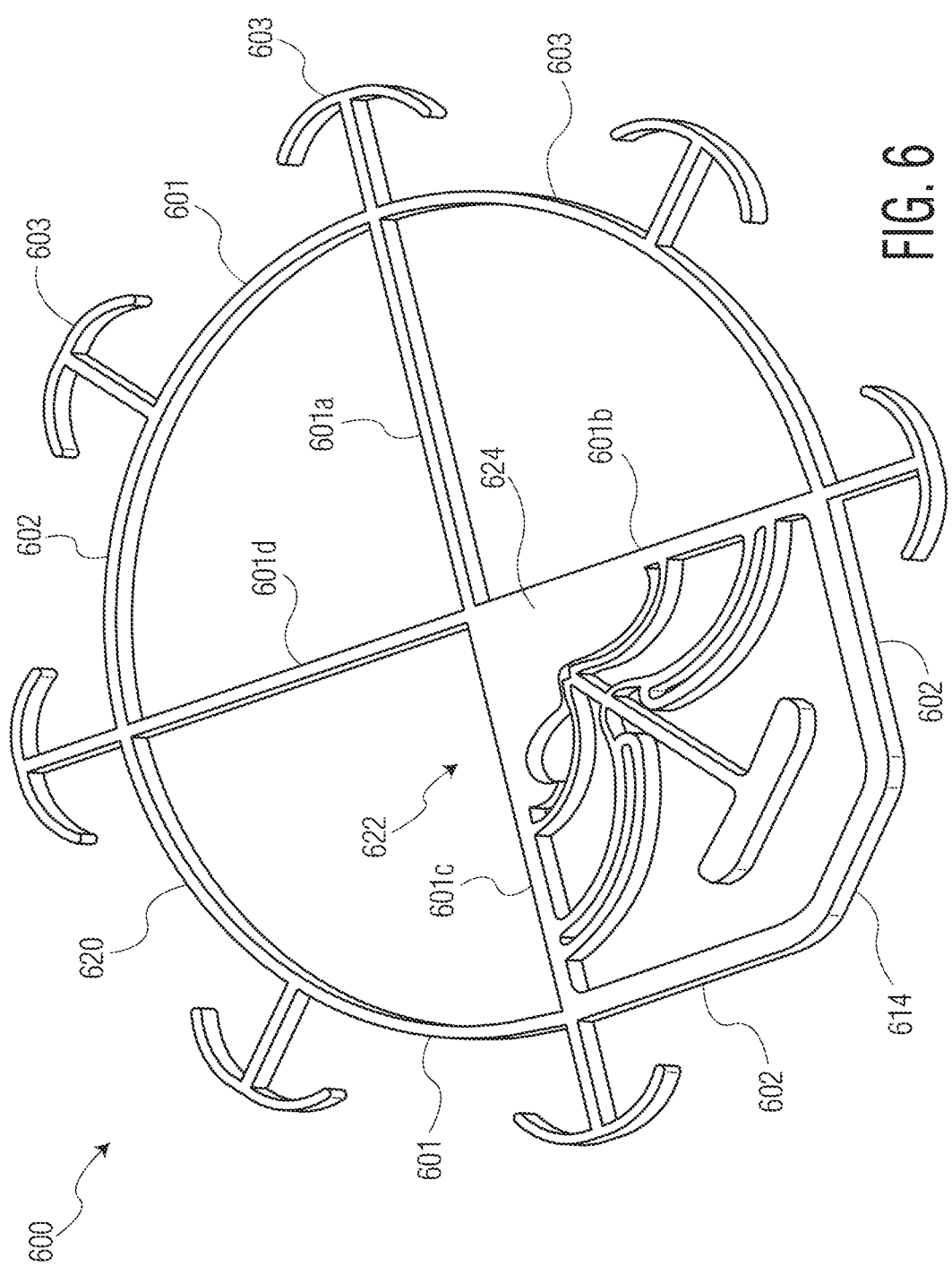
FIG. 6 shows a top front perspective view of a portion of a support system in accordance with further embodiments of the present system.

FIG. 6 shows a top front perspective view of a portion of a support system 600 (hereinafter system 600 for the sake of clarity) in accordance with embodiments of the present system. The system 600 may be similar to the system 100 and may include a support structure 620 having one or more of a base 624, one or more support beams 601a through 601d, a coupler 622 and a support ring 602 which may include wall portions 601, 602 and 614. Wall portion 614 may be similar to wall portion 114 of FIG. 1. However, wall portions 601 form a semicircular shape. Further, it is envisioned that wall portions 601 may form a circular shape as may be desired. The support ring 602 may include a plurality of receiving anchors 603.

It is further envisioned that embodiments of the present system may be employed to control plant growth and support limbs, fruit, and/or flowers. For example, controlled and proper support of plant portions allows for spreading open the plant thus providing improved and/or controlled air movement and increased light to desired inner portions that promotes growth and health of the plant, including the desired inner portions that otherwise may not grow and thrive as fast. It is further envisioned that embodiments of the present system may be employed as a hanger to hang, for example, wires (e.g., to hang or otherwise organize the wires and the like), cords (e.g., extension cords and the like), decorative lighting (e.g., Christmas lighting and the like), fruit, laundry, and/or the like. A combination of different sized and shaped portions of the present system, such as different sized and shaped support ring(s), coupler(s), receiving anchor(s) and/or biasing member(s), may be used to provide a custom plant support for a particular plant or plant type.

Figure 7:
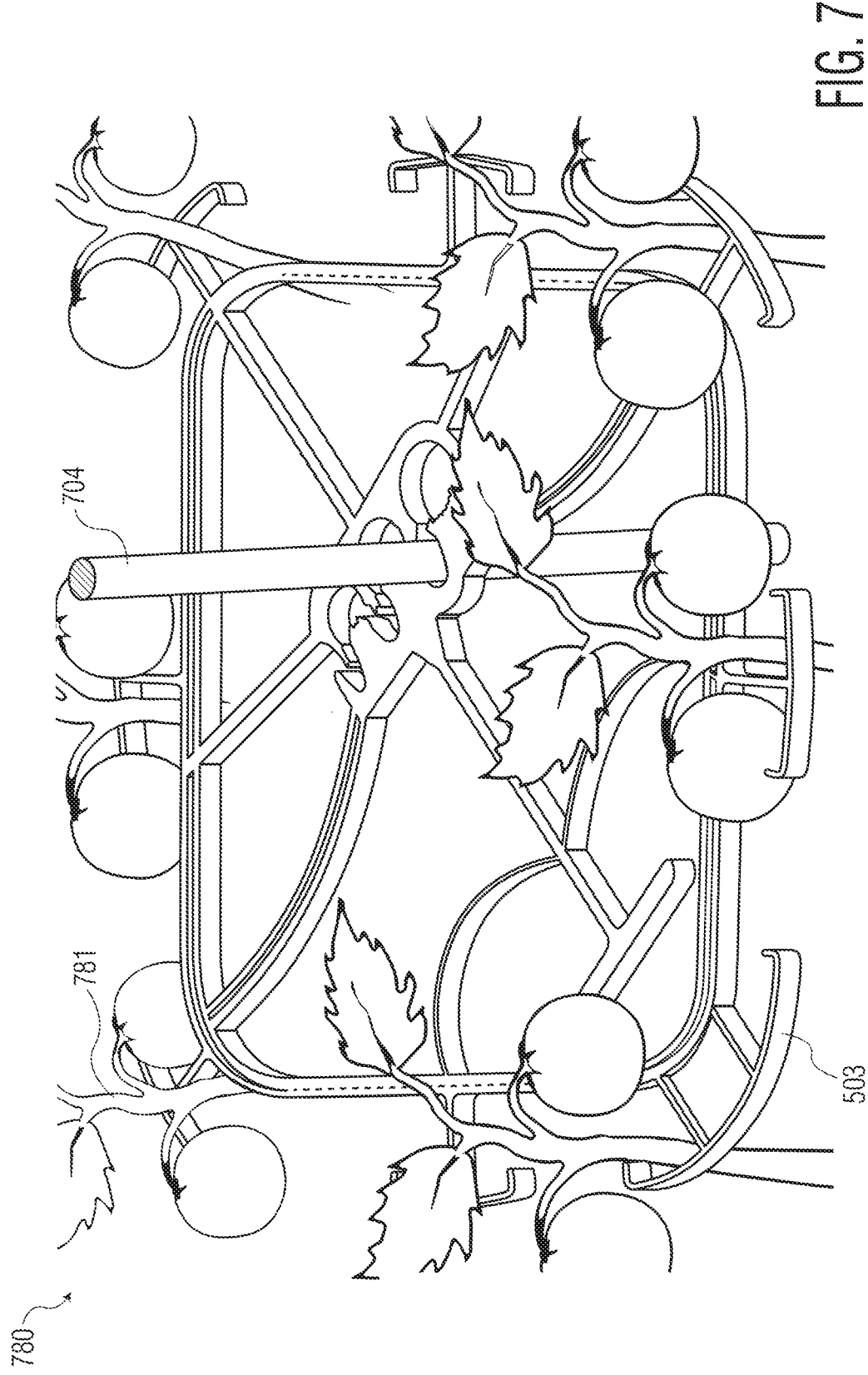
FIG. 7 shows an image rendering of the support system of FIG. 5 supporting a plant in accordance with embodiments of the present system.

Exemplary embodiments of the system in use will now be shown and described with reference to FIG. 7 which shows a rendering 780 of the support system 500 supporting a tomato plant 781 in accordance with embodiments of the present system. Branches of the tomato plant 781 may be attached to corresponding receiving anchors 503. Accordingly, embodiments of the present system may provide a plant support and training system.

Figure 8A:
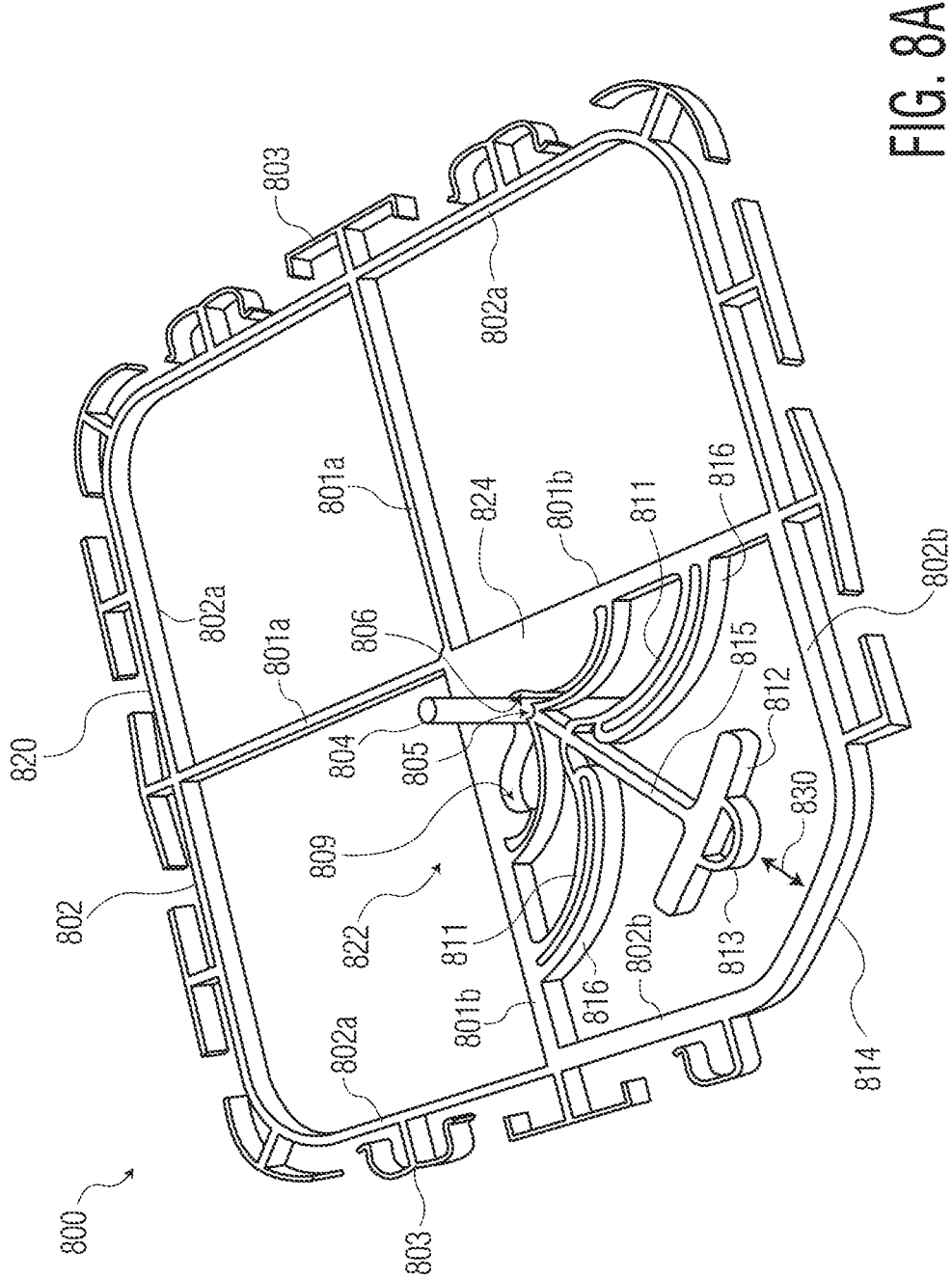
FIG. 8A shows a top front perspective view of a portion of a support system clamping a portion of a VCS in accordance with embodiments of the present system.
Figure 8B:
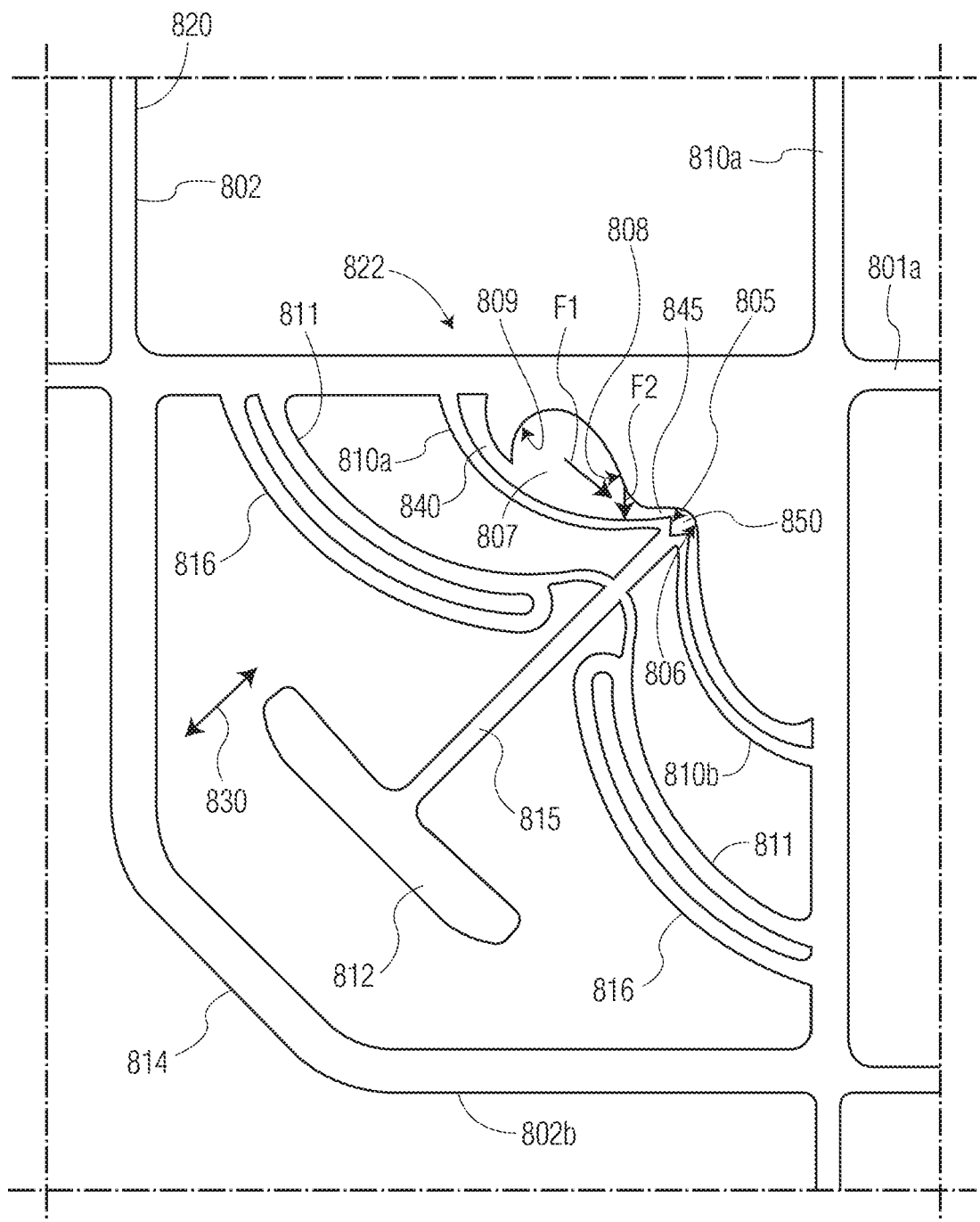
FIG. 8B shows a top planar view of a portion of the support system of FIG. 8A in accordance with embodiments of the present system.

FIG. 8A shows a top front perspective view of a portion of a support system 800 (hereinafter system 800 for the sake of clarity) clamping a portion of a VCS 804 in accordance with embodiments of the present system. FIG. 8B shows a top planar view of a portion of the support system 800 in accordance with embodiments of the present system.

With reference to FIGS. 8A and 8B, the system 800 may include a planar support structure 820 may be adapted to be suspended in a substantially horizontal orientation by the VCS 804 (which column may, for example be a bamboo stake, or a taut rope). The planar support structure 820 may include one or more of a base 824, and one or more primary support beams such as four primary support beams 801*a* and 801*b* (generally 801*x*) which may extend from a center of the planar support structure 820 outward to a peripheral support ring 802 which may include support ring portions 802*a*, 802*b*, and 814 and which may be continuous. The peripheral support ring may be formed as a continuous square-ring shaped beam which may include filleted and chamfered corners and may run around the periphery of the planar support structure 820 joining the four primary support beams 801*x*. It is envisioned that in some embodiments, each of the primary support beams 801*x* may be about 110 mm long and the peripheral support ring 802 may be approximately 800 mm in circumference.

It is envisioned that a plurality of receiving anchors 803 may be shaped as T or hooked-T shaped tabs and may be spaced at regular or irregular intervals around periphery of the peripheral support ring 802 and may extend outward from the peripheral support ring 802. The receiving anchors 832 may be configured to retain plant stems, fruit and the like associated therewith and prevent them from slipping along or falling away from the peripheral support ring 802. The particular number, size and/or shape of the receiving anchors may be adapted to the particular characteristics of the plants which are envisioned of being supported.

The planar support structure 820 may include an integrated spring clamp 822 which may be operative as a coupler to couple the planar support structure 820 to the VCS 804. In embodiments of the present system, it is envisioned that the spring clamp 822 may include of two groups of parts, which may be collectively referred to as movable clamping structure and a stationary clamping structure.

The stationary clamping structure may include, among other things, portions of two adjacent primary beams 801*b* which may extend from a center of the planar support structure 820 and may be positioned relative to each other at substantially a right angle. A solid section of material with a contoured edge, with surfaces 806, 808, and 809 may fill in a small area between the primary beams 801*b* proximal to the intersection point of the primary beams 801*b*. It is envisioned that the planar face of this contoured edge may be approximately 80 mm in length. The surface 806 may be known as a stationary clamping surface and may be concave with a cam-lobe-shaped profile. Distal ends of the primary support beams 801*b* may be joined by a section of the peripheral support ring 802 formed by adjacent support ring portions 802*b* and 814, where the ring portion 814 connects two ring portions 802*b*. The ring portion 814 may form a chamfered corner of the peripheral support ring 802 and may form a spring clamp palm rest configured to receive a palm of a user's hand when the user engages the integrated spring clamp 822. It is envisioned that the spring clamp palm rest (e.g., section 814) may include a straight beam segment that may be about 65 mm in length running 45 degrees relative to both adjacent primary support beams 801*b*. The stationary clamping structure may be configured using materials and/or wall thicknesses such that it may have minimal deformation during operation of the integrated spring clamp 822 and may remain stationary relative to the other primary support beams 801*a* and/or the other sections of the peripheral support ring 802 such as the support ring portions 802*a* outside of the stationary clamping structure.

The movable clamping structure may be located within the area surrounded by the stationary clamping structure and may include one or more of: a movable clamping surface 805, a central clamp spine 815, an opening handle 812, a clamp extension limiter 813, and leaf springs 810*a*, 810*b*, 811, and 816.

Leaf springs 810*a* and 810*b* may be referred to as front leaf spring and may be flexible arc-shaped supports with distal ends coupled to respective one of the primary beams 801*b* and proximal ends converging and coupled to the central clamp spine 815. The proximal ends of the front leaf springs (e.g., 810*a* and 810*b*) may be coupled to the central clamp spine 815. The central clamp spine may form the movable clamping surface 805.

Leaf springs 811 may be referred to as rear spring leaves and may be flexible springs with an s-shape and may have distal ends coupled to the primary support beams 801*b* and proximal ends converging and coupled to the central clamp spine 815.

Leaf springs 816 may be referred to as auxiliary rear spring leaves and may be flexible arc-shaped supports, with distal ends coupled to respective ones of the primary support beams 801*b* and proximal ends coupled to the rear leaf springs (e.g., 811) approximately 10 mm before the rear leaf springs (811) terminate at the central clamp spine 815.

The opening handle 812 may include a rigid beam which may be perpendicular to, and/or extend transversely from, distal end (relative to the planar support structure) of the central clamp spine 815. The central clamp spine 815 may be a semi-rigid shaft which is coupled to the front leaf spring (810*a* and 810*b*), the rear leaf springs (811), and the opening handle 812.

The movable clamping surface 805 may be positioned opposite to the stationary clamping surface 806 and may include a "V"-shaped slot formed at and/or by the proximal ends of front leaf spring leaves 810*a* and 810*b* and may be perpendicular to the horizontal plane of the planar support structure 820 (e.g., an x-y plane) so as to receive the VCS 804. However, the clamping surfaces may include other shaped slots depending upon an intended cross-sectional shape of the VCS 804 (which is round in the present embodiments).

The clamp extension limiter 813 may protrude behind the handle 812 such that it is opposite to an inside edge of spring clamp palm rest (e.g., the ring portion 814). An opening is formed between the clamp extension limiter 813 and the handle 812 which may facilitate use of the support system 800, such as by insertion of the user's finger in the opening for pulling the movable clamping surface 805 back away from the stationary clamping surface 806 to the open position for acceptance, removal or position adjustment of the VCS 804.

Without the presence of a VCS 804, the movable clamping structure may be situated in close proximity to the stationary clamping surface 806 with about 4 mm separating the most distant points of the clamping surfaces (e.g., the movable clamping surface 805 and the stationary clamping surface 806).

The leaf springs 810*a*, 810*b*, 811, and 816 may be flexible and, when force is applied to the movable clamping structure either in the form of a user pulling on the opening handle 812 toward the spring clamp palm rest (e.g., 814) or via compressive force exerted by the VCS 804 on the movable clamping surface 805 (such as during positioning of the VCS 804 in the opening between the movable 805 and stationary 806 clamping surfaces), the leaf spring 810*a*, 810*b*, 811, and 816 may deform elastically allowing the movable clamping structure (e.g., via the movable clamping surface 805) to move away from the stationary clamping surface 806 a distance of about 12 mm in the present embodiments.

However, other distances are also envisioned. In the course of this the movement, the movable clamping structure as well may be constrained to remain within the plane of the overall planar support structure 820 (e.g., parallel to the x-y plane of the planar support structure 820); moving along a longitudinal axis of the central clamp spine 815 in a direction indicated by arrow 830. When the movable clamping structure may be sufficiently deflected distally, the clamp extension limiter 813 may contact the spring clamp palm rest (e.g., 814) and may prevent additional deflection.

It is envisioned that the integrated spring clamp 822 may be configured to grip VCS 804 having diameters ranging from about 5 mm to 12 mm and may deflect distally (towards the ring portion 814) to make room for VCS 804 of this diameter range. Contact between the VCS 804 and integrated spring clamp 822 may occurs at the two opposing clamping surfaces defined by the movable clamping surface 805 and the stationary clamping surface 806.

The shape of the clamping surfaces (e.g., the movable clamping surface 805 and the stationary clamping surface 806), in conjunction with the variable position of the movable clamping structure and the reactive force exerted by the leaf springs 810a, 810b, 811, and 816 as the movable clamping structure is deflected distally, provides for the integrated spring clamp 822 to grip VCS 804 and resist movement of the planar support structure relative to the VCS 804.

A column insertion channel 807 may include a generally tear-drop shaped opening formed, at least in part, by one or more of a column insertion channel backstop 809, a column insertion channel ramp 808, and the front leaf spring 810a. A surface forming at least a portion of the perimeter of the opening may include first and second gaps 840 and 845, respectively. With regard to these gaps, as shown in FIG. 8B, the first or distal gap 840 may be situated between the lower protruding tip of the insertion channel backstop 809 and the distal end of the front leaf spring 810a relative to the spine 815. The second or proximal gap 845 is near the spine and is the proximal end of the insertion channel 807 where the VCS 804 passes through during insertion in, and removal from, the interstitial space 850 between a pair of clamping surfaces 805, 806. In particular, the second or proximal gap 845 is an elongated empty space near the spine bordered by the proximal end of the front leaf spring 810a and the column insertion channel ramp 808. The column insertion channel ramp 808 may be angled in such a way that a VCS 804 pushed towards the interstitial space 850 (through the insertion channel 807) will contact the ramp 808 and create a resultant force that pushes opens the movable half of the clamp 822, where the movable clamping surface 805 is pushed away from the stationary clamping surface 806. For example, when the VCS 804 is pushed into the channel with a force in direction F1, as shown in FIG. 8B, the ramp 808 partially opposes this force, and pushes the VCS 804 in the direction F2, which causes the clamp 822 to push open. This allows insertion of the VCS 804 in the interstitial space 850 with a one-handed operation, without even pulling on the handle 812.

The column insertion channel ramp 808 may include a surface that opposes a proximal end of the front leaf spring leaf 810a and may form a narrowing channel leading away from the column insertion channel backstop 809 and may be situated towards the clamping surfaces (e.g., the movable clamping surface 805 and the stationary clamping surface 806). A profile of insertion channel ramp 808 may be roughly a mirror image of the edge of the front leaf spring leave 810a reflected about a plane intersecting the center of the VCS 904 and the column insertion channel backstop 809. The column insertion channel backstop 809 may be a semicircular surface that may form an edge of the column insertion channel 807 (which may be formed from part of the first gap 840).

While in the present embodiment the interstitial space 850 is described to be formed by the opposable movable and stationary clamping surface 805, 806, in alternate embodiments, the interstitial space may instead be formed by a C-shaped opening in the base 824. The C-shaped opening has one continuous surface and deforms when a VCA 804 of a proper predetermined right size and shape is forced into the C-shaped opening, then the C-shaped opening returns to its original shape to maintain in place the VCA 804. Thus, the clamp 822 may have C-shaped opening with a single concave surface made of deformable material.

It is envisioned that the planar support structure 820 may be 9 mm thick in the vertical dimension (e.g., the z axis, such as the longitudinal axis of the VCS 804) and is may be formed from a creep-resistant thermoplastic or thermoplastic-composite (such as Polyethylene terephthalate (PETG) or the like reinforced with fiberglass), produced via 3D printing or injection molding and formed as a single unitary part.

It should be appreciated that embodiments of the present system may provide a system and method to position portions of plants such as branches, flowers, buds, and/or fruits, in preferred arrangements and/or heights which can enhance growth and yield of the plant. Additionally, damage to plants, or portions thereof, may be reduced or entirely eliminated. For example, in indoor growing environments which employ high-output artificial light sources, there is a fairly narrow window of plant height where the plants will not be damaged and energy will not be wasted. For example, if portions of the plants are too high relative to a light source, they may be damaged (e.g., scorched) by overly-intense light. Conversely, when portions of plants are too low relative to a light source, growth of the plants may be slowed due to insufficient illumination and energy may be wasted. Accordingly, embodiments of the present system may accurately control the height of plants. Further, embodiments of the present system may spread growth of plants such that a large portion of a corresponding plant is situated within a desired height range. This can prevent damage to plants as well as maximize yield. Embodiments of the present system may be employed with adjustable height lighting that may be adjusted as plants grow. Further, embodiments of the present system may spread plants out and may retard vertical growth; this can minimize the need for frequent repositioning of lights.

Figure 9:
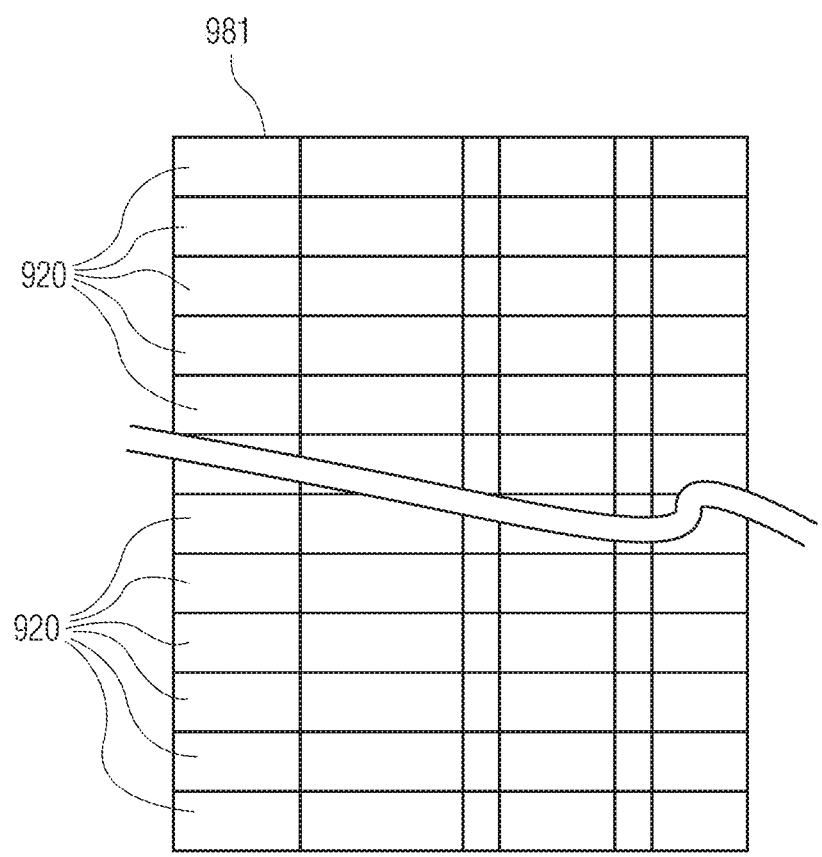
FIG. 9 shows a front side view a plurality of planar support structures arranged in a configuration forming a stack in accordance with embodiments of the present system.

FIG. 9 shows a front side view a plurality of planar support structures 920 arranged in a configuration forming a stack 981 in accordance with embodiments of the present system. By employing the planar arrangement, a plurality of support structures 920 may be arranged in the stack 981 which may enhance, storage, shipping, handling, and use of embodiments of the present system.

Figure 10:
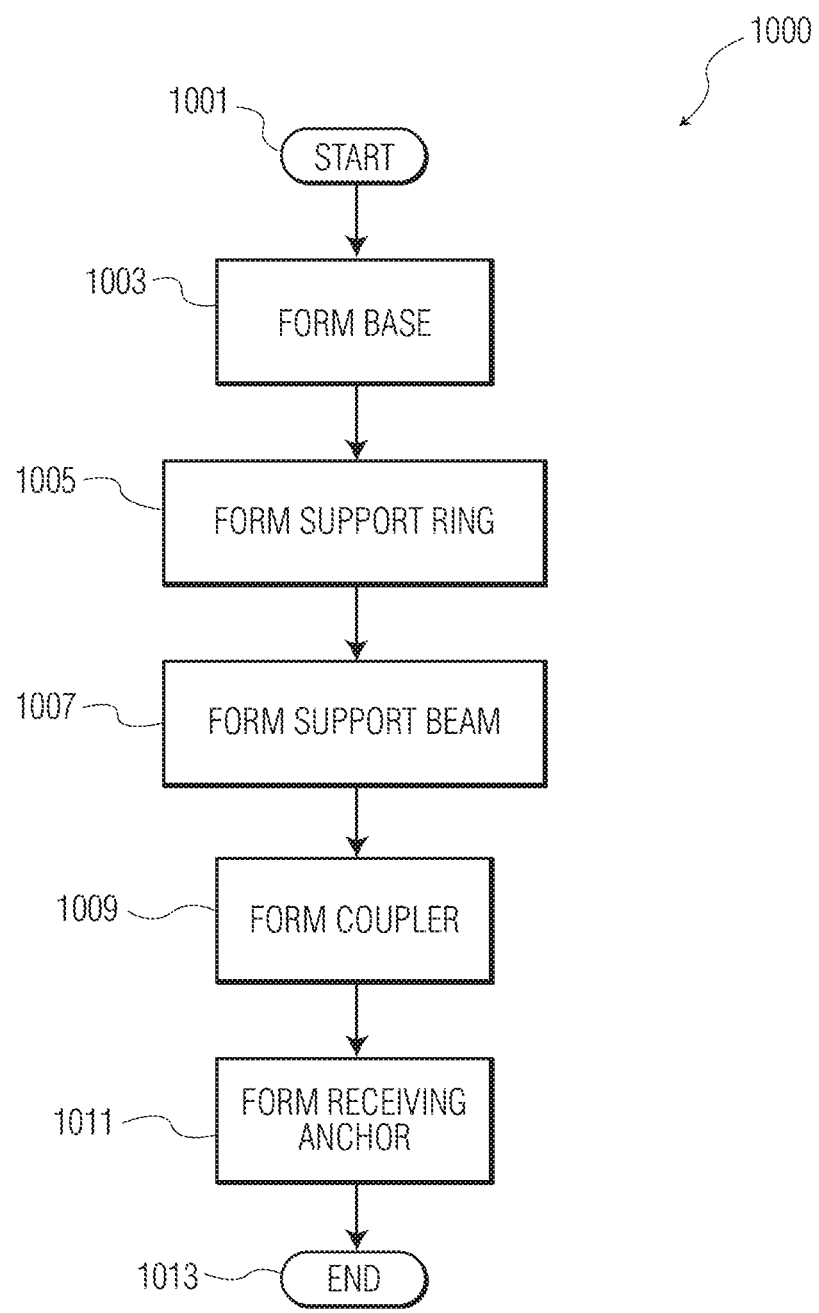
FIG. 10 shows a functional flow diagram performed by a process in accordance with embodiments of the present system.

FIG. 10 shows a functional flow diagram performed by a process 1000 in accordance with embodiments of the present system. The process 1000 may be performed using one or more processors, computers, controllers, etc., communicating over a network and may obtain information from, and/or store information to one or more memories which may be local and/or remote from each other. The process 1000 may include one of more of the following acts. Further, one or more of these acts may be combined and/or separated into sub-acts, as desired. Further, one or more of these acts may be skipped depending upon settings. In operation, the process may start during act 1001 and then proceed to act 1003. The process may be control an injection molding machine, an additive deposition machine such as a 3D printer, an extruder or the like to perform the acts. Further, one or more of the acts may be combined or split into sub-acts. For example, a 3D printer may perform a portion of an act before performing a portion of another act, etc. The 3D printer may the repeat portions of acts numerous times until finished.

During act 1003, the process may form at least a portion of a base such as the base 124. After completing act 1003, the process may continue to act 1005.

During act 1005, the process may form at least a portion of a support ring such as the support ring 102. After completing act 1005, the process may continue to act 1007.

During act 1007, the process may form at least a portion of a support beam such as the support beam 101. After completing act 1007, the process may continue to act 1009.

During act 1009, the process may form at least a portion of a coupler such as the coupler 122. After completing act 1009, the process may continue to act 1011.

During act 1011, the process may form at least a portion of a receiving anchor such as the receiving anchor 103. After completing act 1011, the process may continue to act 1013 where it may end.

Figure 11:
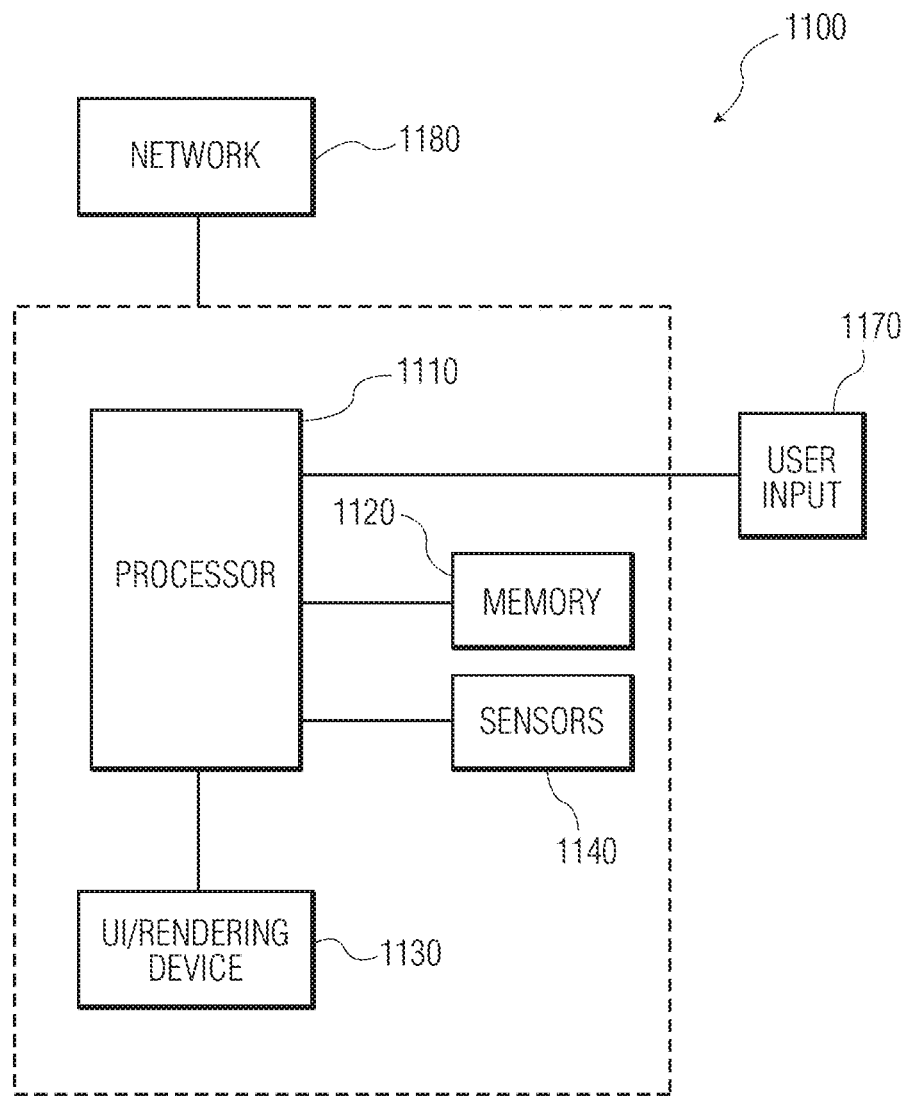
FIG. 11 shows a portion of a system in accordance with embodiments of the present system.

FIG. 11 shows a portion of a system 1100 in accordance with embodiments of the present system. For example, a portion of the present system may include a processor 1110 (e.g., a controller) operationally coupled to a memory 1120, a user interface (UI) including a rendering device such as a display 1130, sensors 1140, and a user input device 1170. The memory 1120 may be any type of device for storing application data as well as other data related to the described operation. The application data and other data are received by the processor 1110 for configuring (e.g., programming) the processor 1110 to perform operation acts in accordance with the present system. The processor 1110 so configured becomes a special purpose machine particularly suited for performing in accordance with embodiments of the present system.

The processor 1110 may render the content such as still or video information on a UI of the system. This information may include information related to operative parameters, instructions, feedback, and/or other information related to the operation of a 3D printer, extruder, and/or molding machine (e.g., injection molding machine). The sensors 1140 may include sensors of the 3D printer, extruder, and/or molding machine (e.g., injection molding machine) or the like and may sense related parameters, form sensor information, and provide this sensor information to the processor 1110.

The user input 1170 may include a keyboard, a mouse, a trackball, or other device, such as a touch-sensitive display, which may be stand alone or part of a system, such as part of a personal computer, a personal digital assistant (PDA), a mobile phone (e.g., a smart phone), a smart watch, a smart phone, an e-reader, a monitor, a smart or dumb terminal or other device for communicating with the processor 1110 via any operable link such as a wired and/or wireless communication link. The user input device 1170 may be operable for interacting with the processor 1110 including enabling interaction within a UI as described herein. Clearly the processor 1110, the memory 1120, display 1130, and/or user input device 1170 may all or partly be a portion of a computer system or other device such as a client and/or server.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 1120 or other memory coupled to the processor 1110.

The program and/or program portions contained in the memory 1120 may configure the processor 1110 to implement the methods, operational acts, and functions disclosed herein. The memories may be distributed, for example between the clients and/or servers, or local, and the processor 1110, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 1110. With this definition, information accessible through a network is still within the memory, for instance, because the processor 1110 may retrieve the information from the network for operation in accordance with the present system.

The processor 1110 is operable for providing control signals and/or performing operations in response to input signals from the user input device 1170 as well as in response to other devices of a network and executing instructions stored in the memory 1120. The processor 1110 may include one or more of a microprocessor, an application-specific or general-use integrated circuit(s), a logic device, etc. Further, the processor 1110 may be a dedicated processor for performing in accordance with the present system or may be a general-purpose processor wherein only one of many functions operates for performing in accordance with the present system. The processor 1110 may operate utilizing a program portion, multiple program segments, or may be a hardware device utilizing a dedicated or multi-purpose integrated circuit.

The processor 1110 may be operable to control a layered deposition system such as a 3D printer to deposit material in desired locations in accordance with embodiments of the present system. Similarly, the processor 1110 may be operable to control an injection molding system such as a plastic injection molding system in accordance with embodiments of the present system. It is also envisioned that the processor 1110 may be operable to control an extruder such as a plastic extruder in accordance with embodiments of the present system. The processor 1110 may be operable to control a cutter to cut extrusions at desired lengths of the extrusion so as to form all or portions of the support system in accordance with embodiments of the present system.

Figure 12:
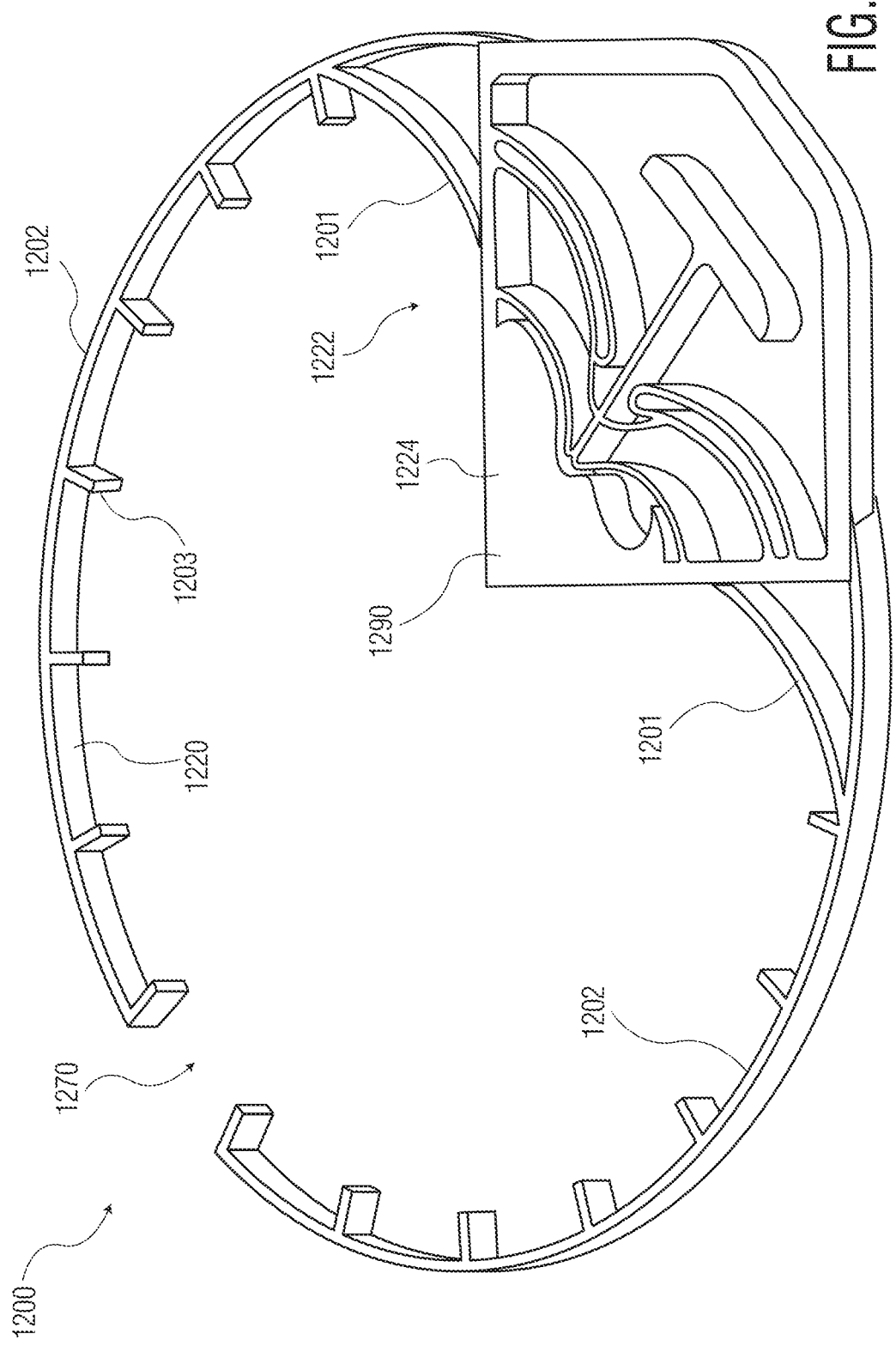
FIG. 12 shows a top front perspective view of a portion of a support system in accordance with embodiments of the present system.

FIG. 12 shows a top front perspective view of a portion of a support system 1200 (hereinafter system 1200 for the sake of clarity) in accordance with embodiments of the present system. The system 1200 may include a support structure 1220 having one or more of a base 1224, one or more support rings 1202, one or more support beams 1201, and one or more couplers 1222. The support ring 1202 may include a plurality of receiving anchors 1203 which may be simple protrusions as shown or may include a hook such as a "T"-shaped hook or tabs and/or the like and may be spaced at equal or non-equal distances from each other about a periphery of the support ring 1202. The support ring 1202 may include an opening 1270 such that it may be discontinuous. The opening 1270 may remain open during operation. Alternatively, the opening 1270 may be tied shut, such as by twist-ties, strings and the like that tie together two end receiving anchors 1203, which are located at both sides of the opening 1270 and may have hooks, or may have eyelets through which a tie or string may be passed. A coupler carrier (CC) 1290 may be substituted with other CCs as may be described elsewhere in this application and may be coupled to the support ring 1202 or other support rings as may be described within this application.

Figure 13:
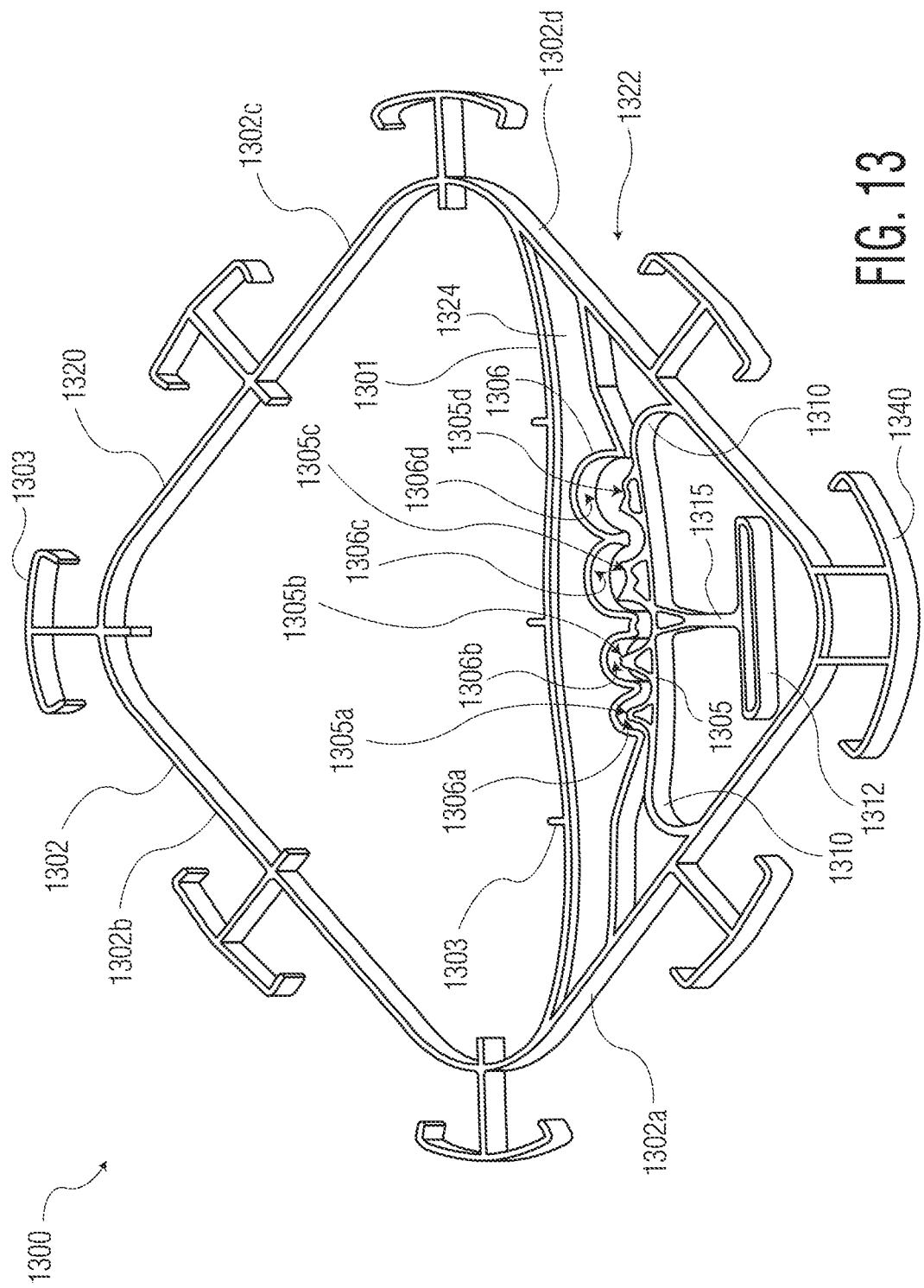
FIG. 13 shows a top front perspective view of a portion of a support system in accordance with embodiments of the present system.

FIG. 13 shows a top front perspective view of a portion of a support system 1300 (hereinafter system 1300 for the sake of clarity) in accordance with embodiments of the present system. The system 1300 may include a support structure 1320 having one or more of a base 1324 including a support beam 1301, support ring 1302, and a coupler 1322.

The support ring 1302 may include a plurality of receiving anchors 1303 as may be described elsewhere in this application. However, the base 1324 may include one or more anchors 1303.

The support ring 1302 may include a plurality of wall portions 1302a through 1302d (generally 1302x). A support beam 1301 may extend between and adjacent (or opposite, if desired) wall portions 1302a through 1302d. The support beam 1301 may function to receive a tensile load from the wall portions 1302x coupled thereto when the one or more couplers 1322 are opened. This may increase rigidity of the wall portion 1302 and prevent excessive deformation of the wall portion 1302 during use. The base 1324 may be coupled to, and/or formed integrally with the support beam 1301.

The base 1324 may form at least part of the coupler 1322 (e.g. a clamping mechanism) and may include a surface configured to form at least part of one or more stationary clamping surfaces 1306a through 1306d. Each of these clamping surfaces may be shaped and/or sized to correspond with a shape and/or a size of a cross-sectional of a vertical column support (which may be arranged in a vertical, horizontal, or other direction as may be desired) that may be inserted therein. In the present embodiments, the one or more stationary clamping surfaces 1306a through 1306d each correspond with vertical column supports of different diameters and the same cross-sectional shape (e.g., substantially round). However, it should be understood that the one or more stationary clamping surfaces 1306a through 1306d may each correspond with vertical column supports of different diameters and/or different cross-sectional shapes (e.g., square, rectangular, triangular, polygonal, etc.) as may be desired.

With regard to the coupler 1322 (e.g., clamping mechanism), the coupler 1322 may include one or more of a plurality of biasing members, a movable clamping portion 1305, a clamp spine 1315, and a handle 1312.

The clamping portion 1305 may include a plurality of clamping surfaces such as the stationary clamping surfaces 1306a through 1306d (generally 1306x) and movable clamping surfaces 1305a through 1305d (generally 1305x). The movable clamping surfaces 1305x may be configured to correspond with a shape and/or size of a corresponding stationary clamping surface 1306a through 1305d, respectively such that they may correspond with a shape and/or size of a cross-section of a vertical support column (VCS) which they may receive. For example, each of the movable clamping surfaces 1305a through 1305d (e.g., clamping faces) may have a "V"-shaped surface or the like so as to be able to clamp to a vertical column support that it receives. It is further envisioned that the "V"-shaped surface may be situated normal to a plane of the support structure 1320. Similarly, a surface of the stationary clamping surface 1306 may be situated normal to a plane of the support structure 1320. Each pair of corresponding clamping stationary clamping surfaces 1306x and movable clamping surfaces 1305x may form a clamping pair to accept (in the open position) and retain (in the closed or clamping position) one or more vertical support columns (VCSs). Alternatively, or in addition, other embodiments may include stationary and movable clamping surfaces 1305, 1306 that have shapes other than a "V"-shaped surface or may have a combination of different-shaped surfaces including a partial circle or "C"-shaped surfaces, for example, so as to accept the VCSs of the same sizes and/or cross-sectional shapes. The stationary and movable clamping surfaces 1305, 1306 may have similar or complementary sizes and/or shapes, such as both clamping surfaces 1305, 1306 having a "V" or a "C" shape, for example. Alternatively, or in addition, the stationary and movable clamping surfaces 1305, 1306 may have different sizes and/or shapes, where one may have "V"-shaped surface, while the other may have a "C"-shaped surface.

The clamp spine 1315 may be coupled to the movable clamping portion 1305 at a proximal end and to the handle 1312 at its distal end. The handle 1312 may be suitable for grasping by a user during use.

The biasing members may include a plurality of springs such as leaf springs 1310 each of which may include one or more spring leaves. Accordingly, the biasing members may bias one or more of the movable clamping portion 1305 against a vertical column support when inserted within the clamping pair 1306x, 1305x so as to clamp the VCS in a substantially fixed position. A length of the handle 1312 and/or the clamp spine 1315 may be adjusted so as to limit travel of the handle 1312. Thus, a position and of lengths of the handle 1312 may be situated as at a distance relative to an adjacent portion of the support ring 1302 so as to act as a travel limiter of the movable clamping portion. This may prevent or otherwise limit fatigue of the biasing members (e.g. leaf springs 1310).

A gripping portion 1340 may be configured to be grasped by a user when grasping the handle 1312 as described elsewhere in this application.

Figure 14A:
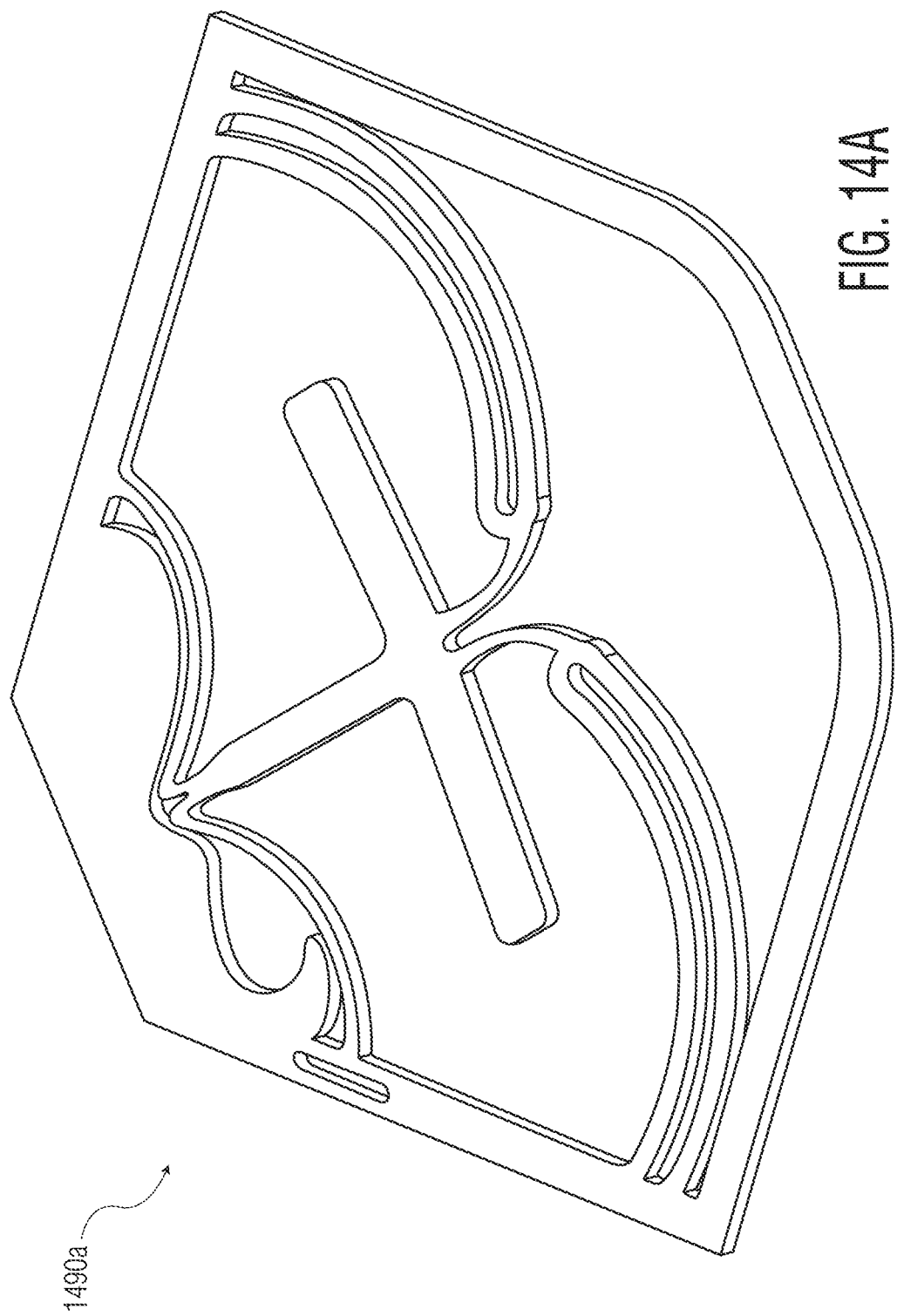
Figure 14B:
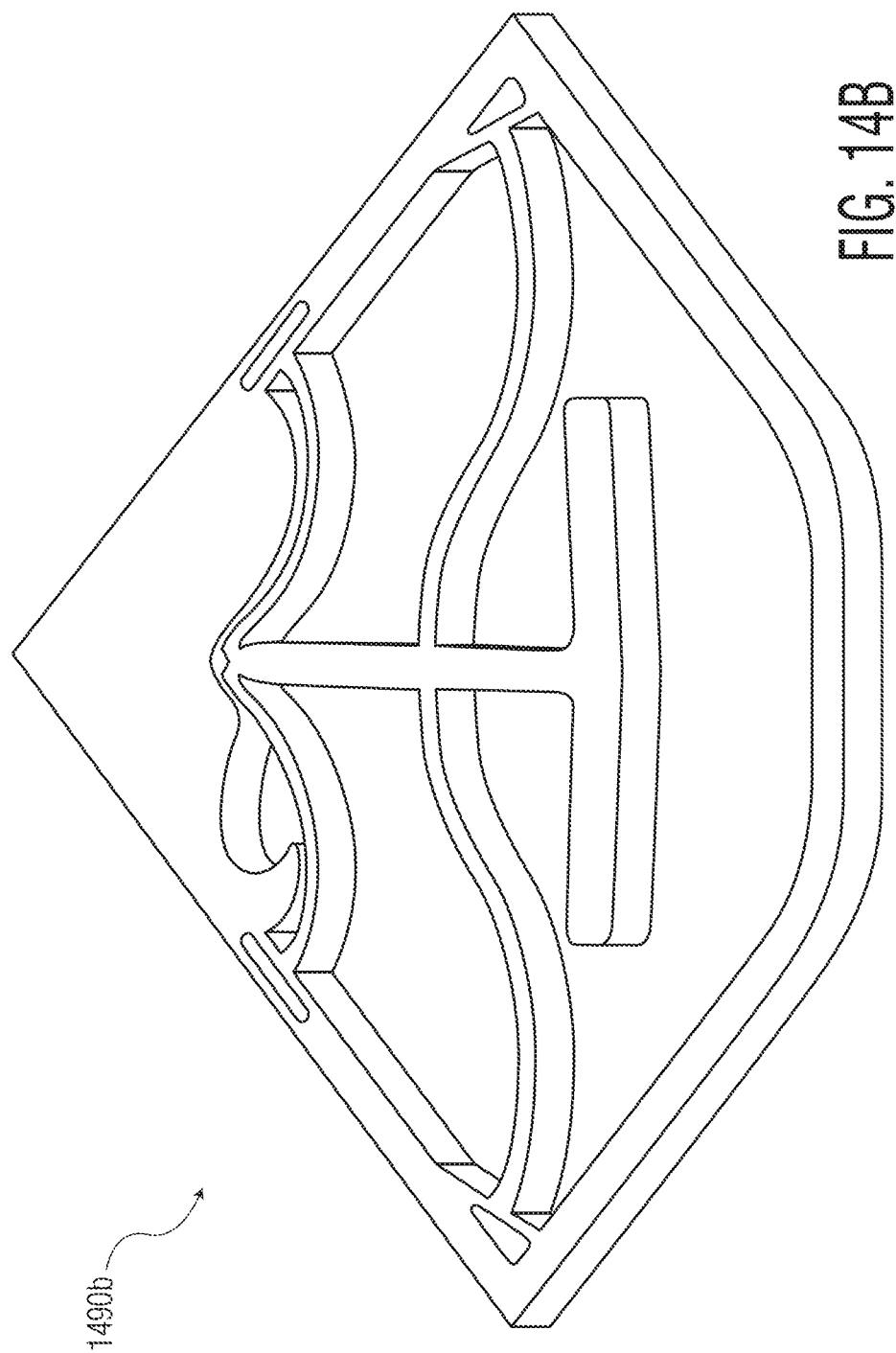
Figure 14C:
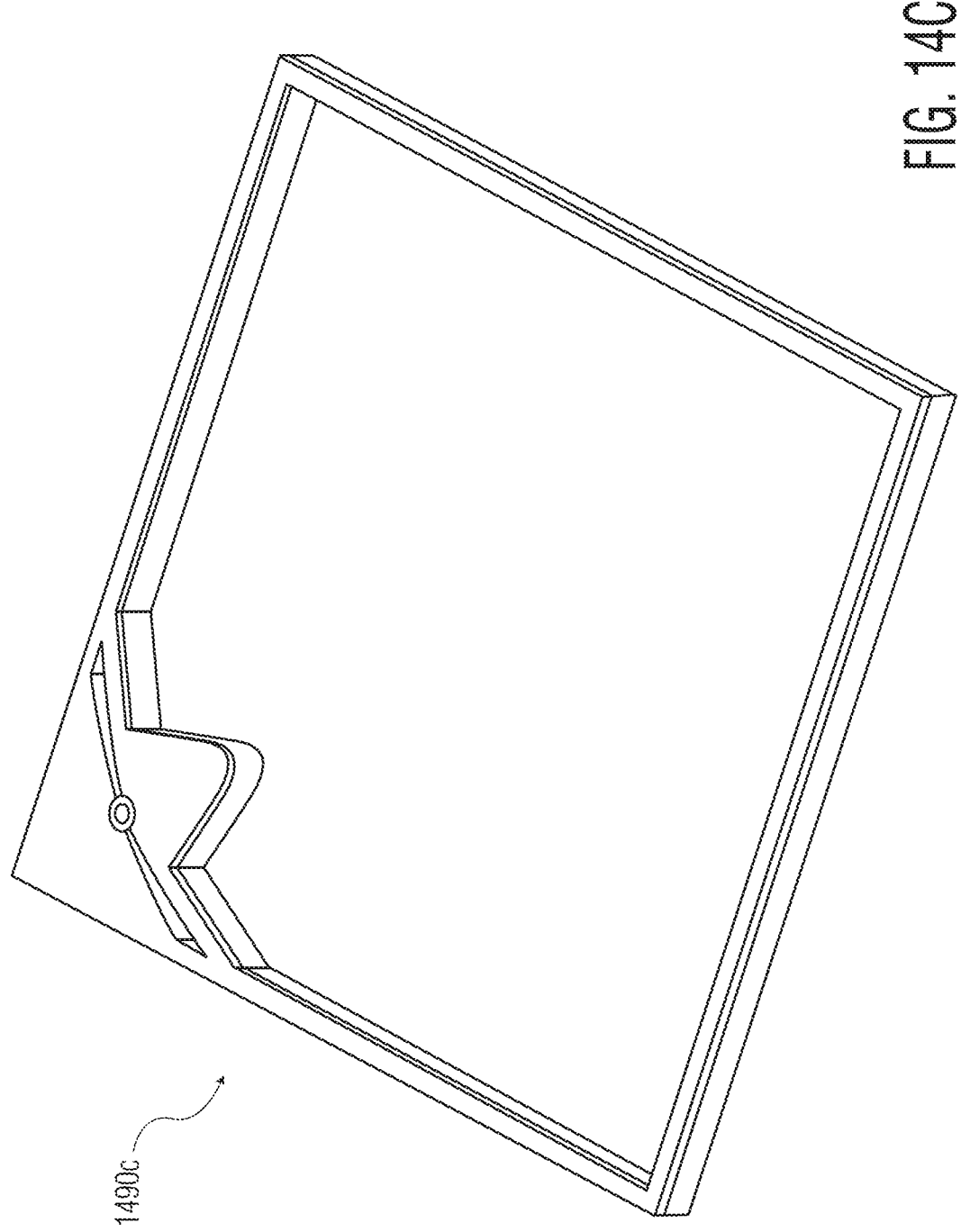
Figure 14D:
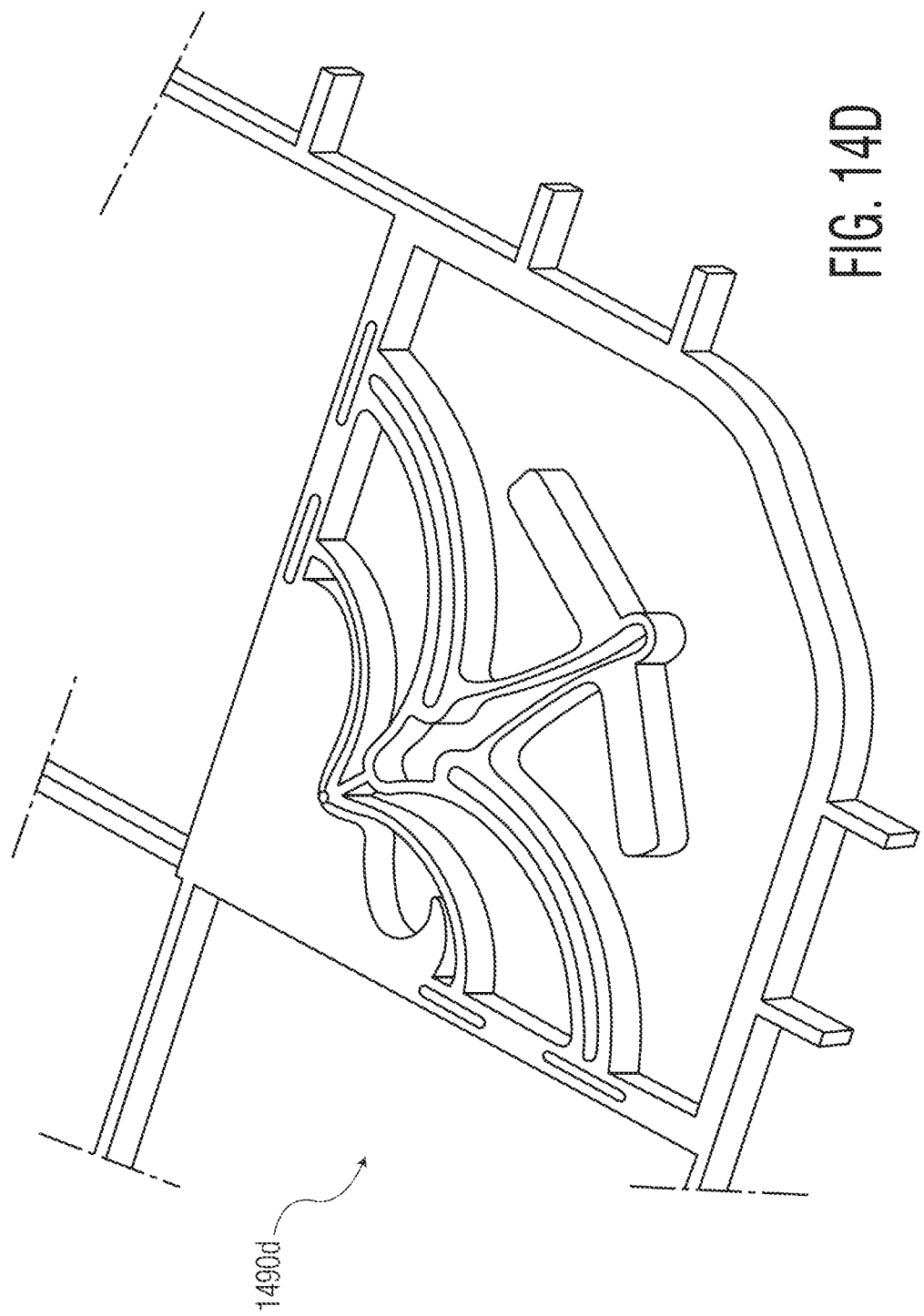
Figure 14F:
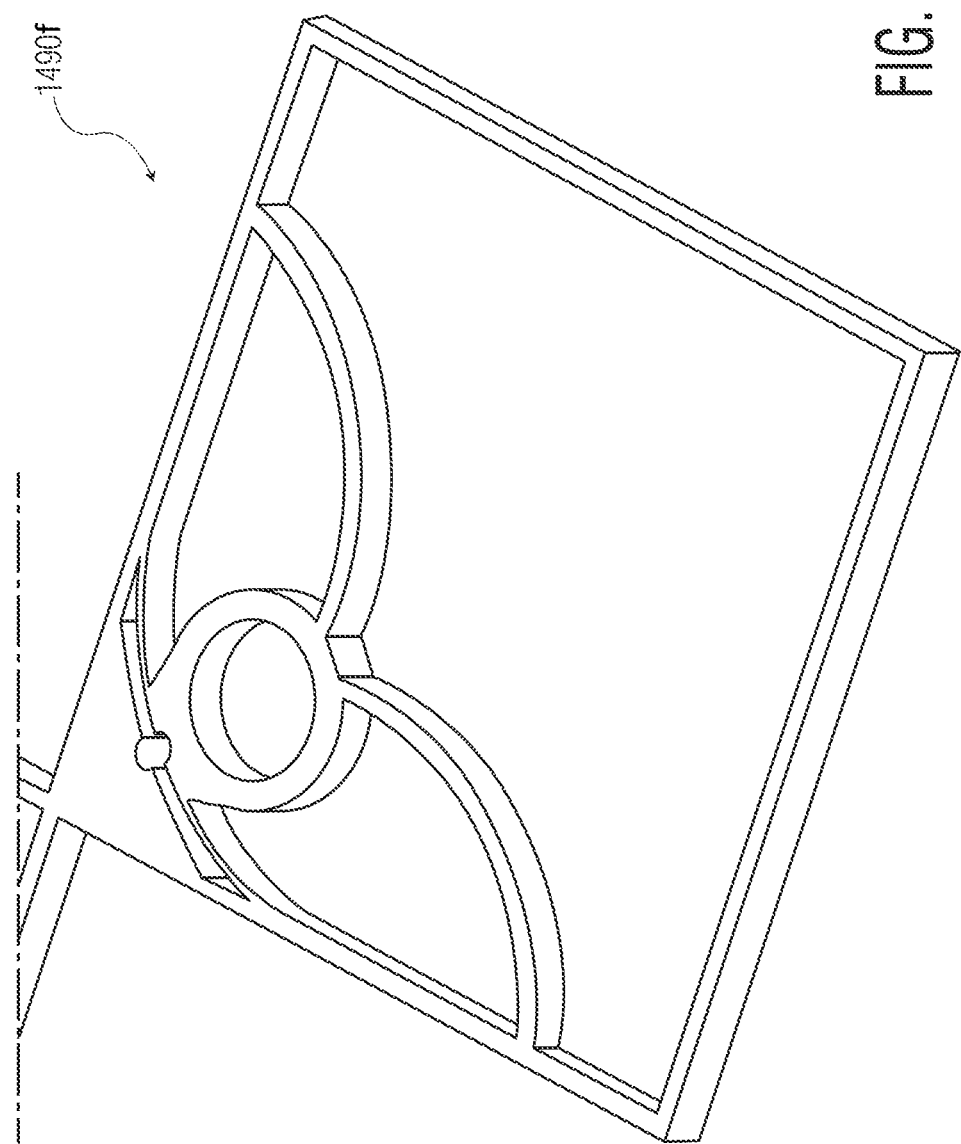

A plurality of different coupler carriers (CCs) will now be described with reference to FIG. 14A through FIG. 14F, where FIG. 14A shows a partially cutaway top front perspective view of a portion of a CC 1490A of a support system in accordance with embodiments of the present system; FIG. 14B shows a partially cutaway top front perspective view of a portion of a CC 1490B of a support system in accordance with embodiments of the present system; FIG. 14C shows a partially cutaway top front perspective view of a portion of a CC 1490C of a support system in accordance with embodiments of the present system; FIG. 14D shows a partially cutaway top front perspective view of a portion of a CC 1490D of a support system in accordance with embodiments of the present system; FIG. 14E shows a partially cutaway top front perspective view of a portion of a CC 1490E of a support system in accordance with embodiments of the present system; FIG. 14F shows a partially cutaway top front perspective view of a portion of a CC 1490F of a support system in accordance with embodiments of the present system. The CCs 1490A through 1490F may be coupled to a wall portion to form a support system.

Figure 15:
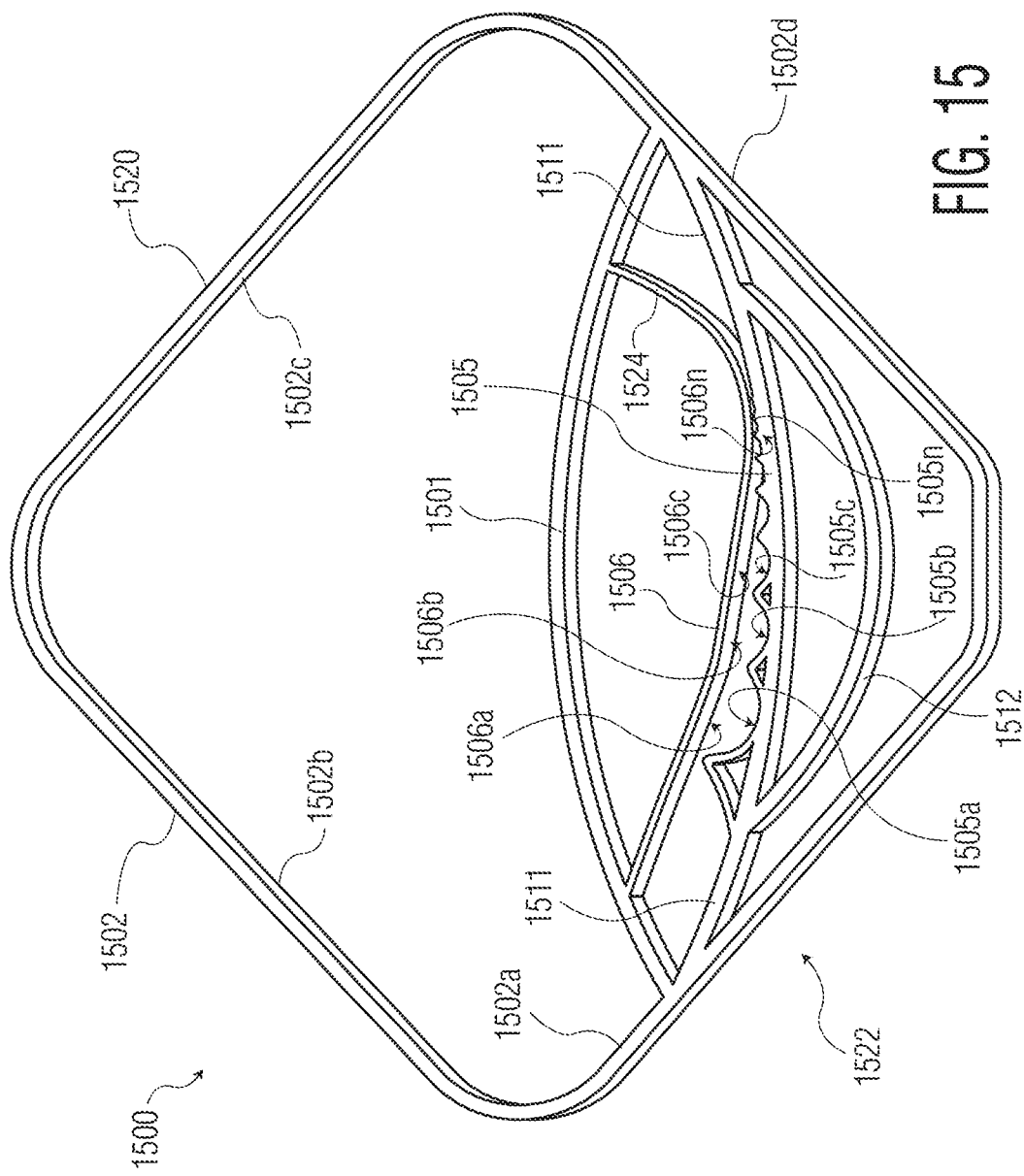
FIG. 15 shows a top front perspective view of a portion of a support system in accordance with embodiments of the present system.

FIG. 15 shows a top front perspective view of a portion of a support system 1500 (hereinafter system 1500 for the sake of clarity) in accordance with embodiments of the present system. The system 1500 may include a support structure 1520 having one or more of a base 1524, a support beam 1501, support ring 1502, and a coupler 1522. The support structure 1520 may be planar or non-planar. Further, the support ring 1502 may be continuous or discontinuous and may include a one or more of wall portions 1502a through 1502d (generally 1502x) which may form a desired shape (e.g., substantially square in the present embodiments). However, it should be understood that the support structure 1520 may be formed in other shapes such as round, rectangular, triangular and polygonal.

With regard to the coupler 1522 (e.g., a clamping mechanism), the coupler 1522 may include one or more of a plurality of biasing members, a movable clamping portion 1505 and a handle 1512 which is directly connected or coupled to leaf springs 1511. Alternatively or in addition, the handle 1512 may be integral with the leaf springs 1511 and the movable clamping surfaces 1505N of the clamping portion 1505.

The clamping portion 1505 may include a plurality of clamping surfaces such as the stationary clamping surfaces 1506a through 1506N (generally 506x, and wherein N denotes an integer) and corresponding movable clamping surfaces 1505a through 1505N (generally 505x). The movable clamping surfaces 1505x may be configured to correspond with a shape and/or size of a corresponding stationary clamping surface 1506a through 1505N, respectively such that they may correspond with a shape and/or size of a cross-section of a vertical support column (VCS) which they may receive. For example, each of the movable clamping surfaces 1505a through 1505N (e.g., clamping faces) may have a "V"-shaped surface or the like so as to be able to clamp to a vertical column support that it receives. Each pair of corresponding clamping stationary clamping surfaces 1506x and movable clamping surfaces 1505x may form a clamping pair to accept (in the open position) and retain (in the closed or clamping position) one or more vertical support columns (VCSs).

Figure 16:
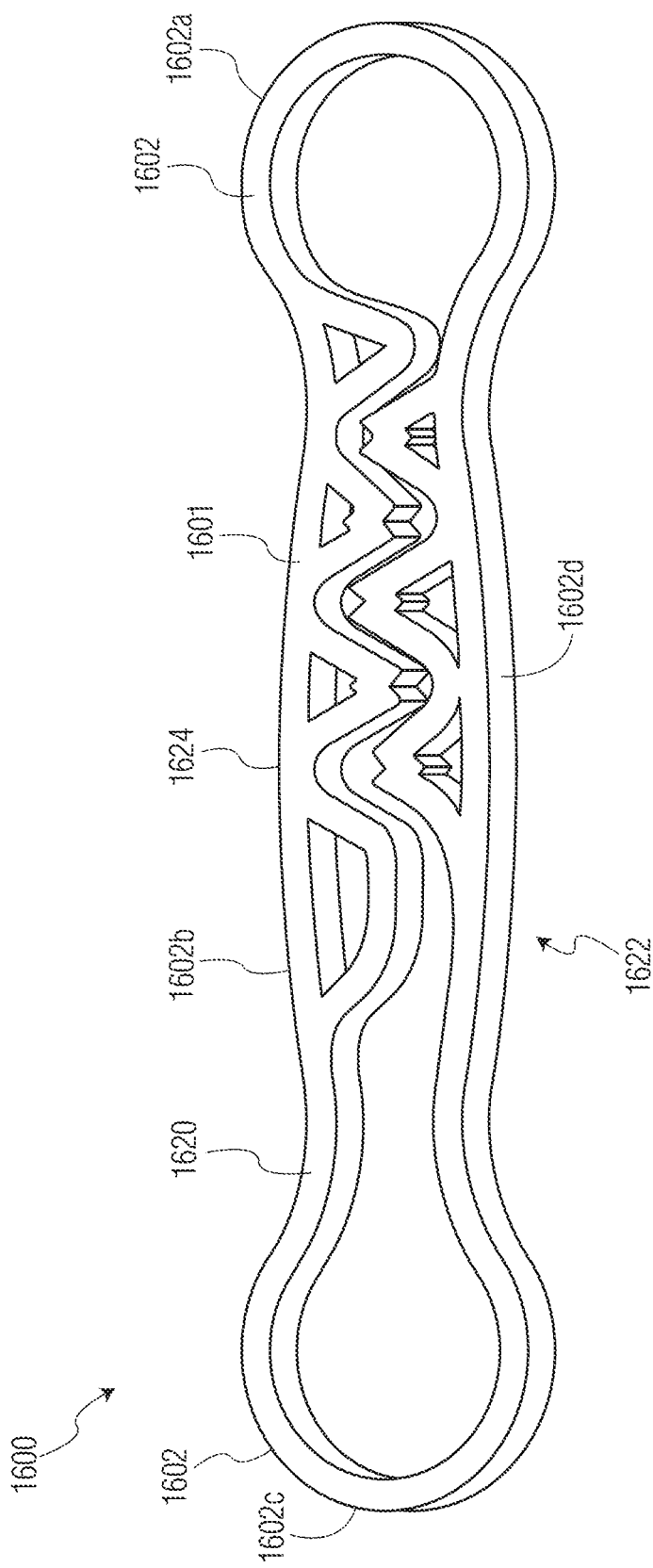
FIG. 16 shows a top front perspective view of a portion of a support system in accordance with embodiments of the present system.

FIG. 16 shows a top front perspective view of a portion of a support system 1600 (hereinafter system 1600 for the sake of clarity) in accordance with embodiments of the present system. The system 1600 may include a support structure 1620 having one or more of a base 1624 including a support beam 1601, support ring 1602, and a coupler 1622. The support structure 1620 may be planar or non-planar. Further, the support ring 1602 may be continuous or discontinuous and may include a one or more of wall portions 1602a through 1602d (generally 1602x) which may form a desired shape (e.g., substantially elongated with circular ends in the present embodiments). However, it should be understood that the support structure 1620 may be formed in other shapes such as square, round, rectangular, triangular and polygonal. Openings 1660 may be provided through which portions of plants may pass and may be supported by corresponding wall portions 1602a and 1602c.

A plurality of coupler carriers (CCs) including ratcheting clamps will be now be discussed with reference to FIGS. 17 through 20 below. These CCs may be coupled to support beams and/or support rings of various embodiments of the present system.

Figure 17:
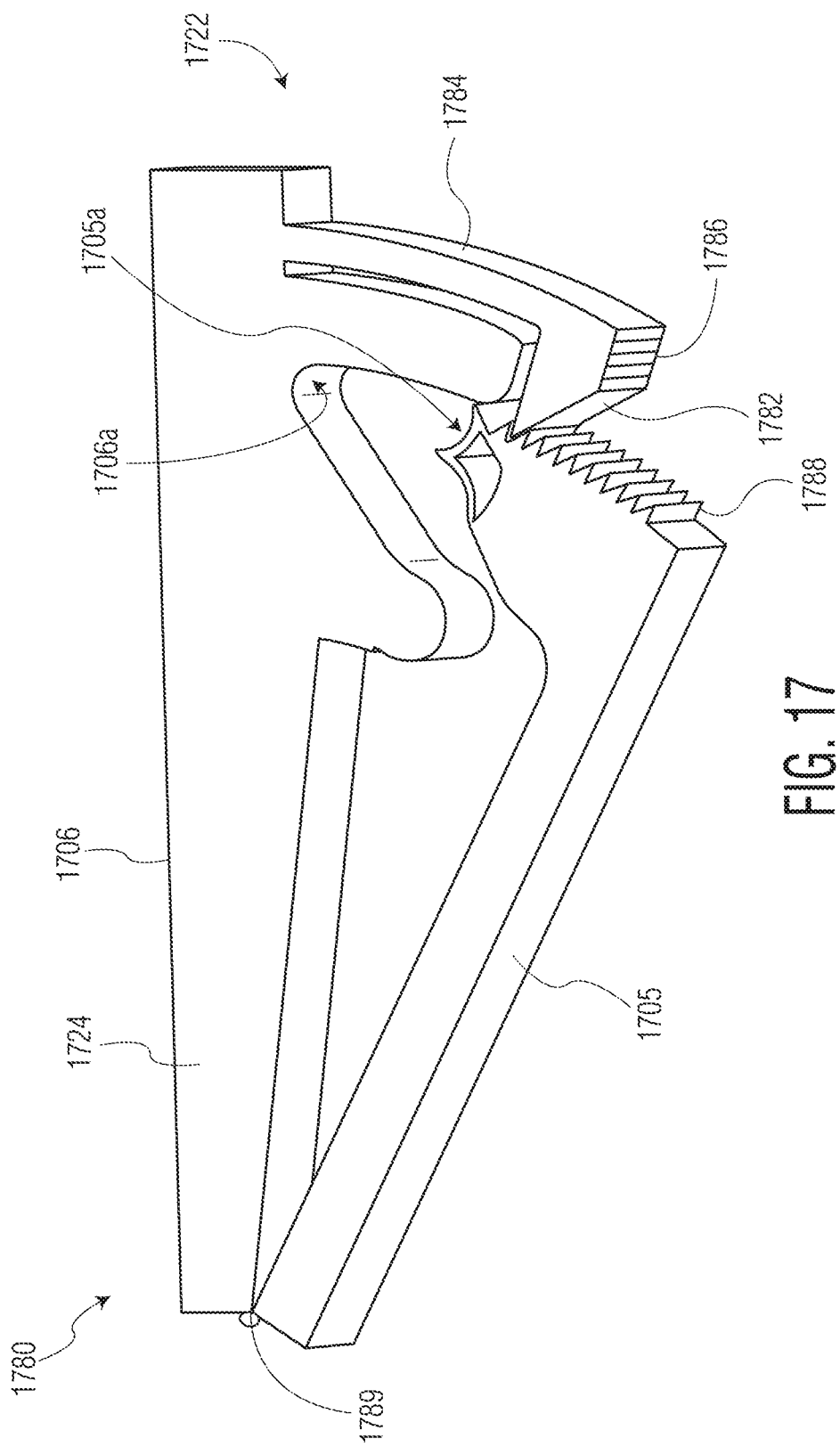
FIGS. 17-20 show perspective views of a portion of a CC in accordance with embodiments of the present system.

FIG. 17 shows a perspective view of a portion of a CC 1780 in accordance with embodiments of the present system. The CC 1780 may include a base 1724 including a locking coupler 1722 having a stationary clamping portion 1706 and a movable clamping portion 1705. The stationary clamping portion 1706 may include one or more stationary clamping surfaces 1706a. The movable clamping portion 1705 may include one or more movable clamping surfaces 1705a.

The movable clamping portion 1705 may be coupled to the stationary clamping portion 1706 using a coupler 1789 such as a hinge 1789. The hinge 1789 may be any suitable hinge such as a simple (e.g., formed integrally with the base 1724, etc.) or a complex hinge. The hinge 1789 may provide a biasing force to open the movable clamping portion 1705 relative to the stationary clamping portion 1706. The stationary clamping portion 1706 may include a latch or pawl 1782 which may engage teeth 1788 of the movable clamping portion 1705 to lock the movable clamping portion 1705 relative to the stationary clamping portion 1706. A biasing member 1784 may bias the pawl 1782 to engage the teeth 1788. A latch release tab 1786 may be moved by a user, e.g., by depressing a selected location of the biasing member 1784, to disengage the pawl 1782 from the teeth 1788. When the CC 1780 is open, a VCS may be inserted between and/or moved relative to one or more of one or more stationary clamping surfaces 1706a and the one or more movable clamping surfaces 1705a. However, when the CC 1780 is locked, the one or more stationary clamping surfaces 1706a and the one or more movable clamping surfaces 1705a may exert a force against the VCS to hold it firmly in place.

Figure 18:
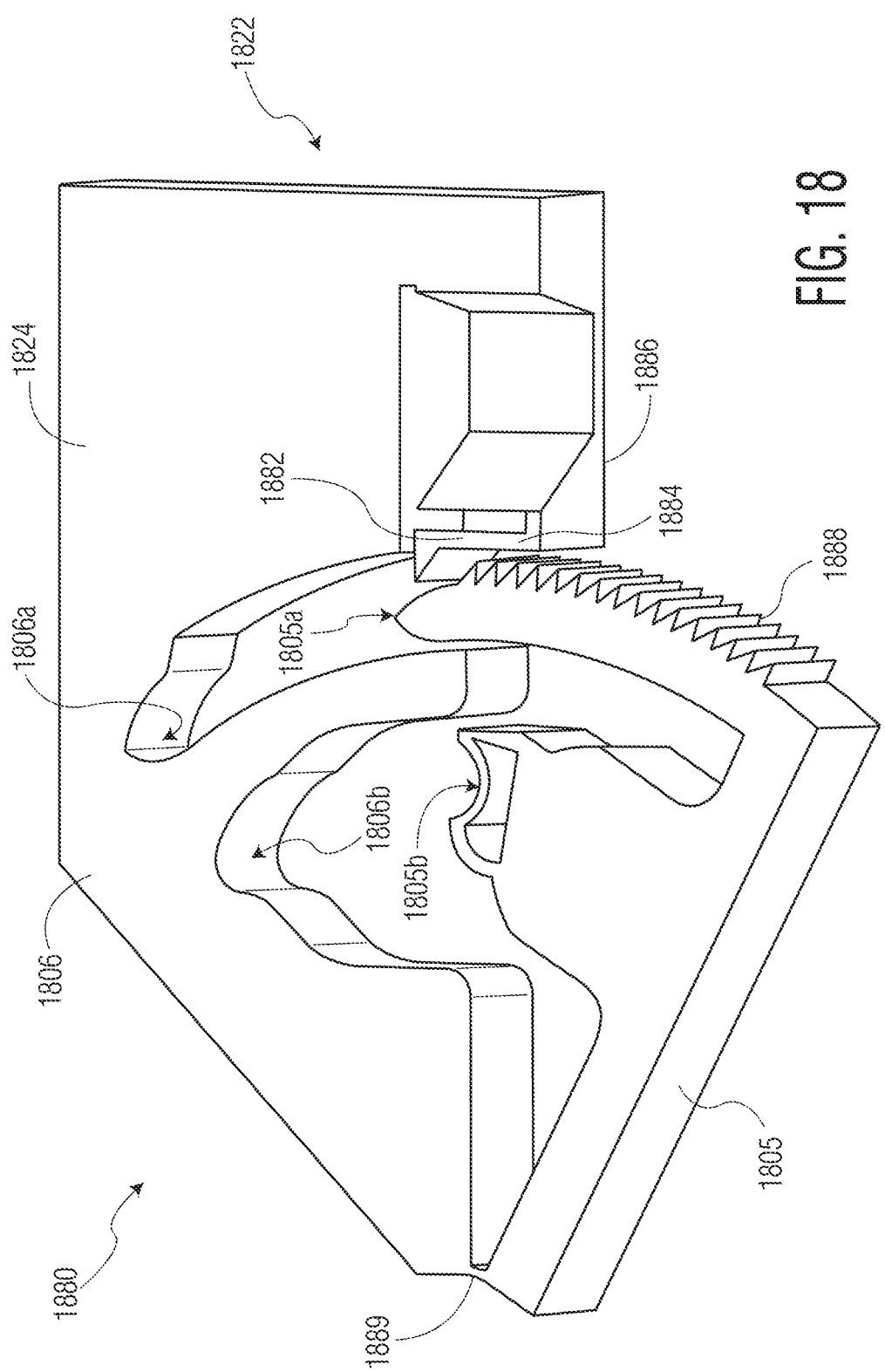

FIG. 18 shows a perspective view of a portion of a CC 1880 in accordance with embodiments of the present system. The CC 1880 may include a base 1824 including a locking coupler 1822 having a stationary clamping portion 1806 and a movable clamping portion 1805. The stationary clamping portion 1806 may include one or more stationary clamping surfaces 1806a and 1806b (generally 1806x). Similarly, the movable clamping portion 1805 may include one or more movable clamping surfaces 1805a and 1805b (generally 1805x).

The movable clamping portion 1805 may be coupled to the stationary clamping portion 1806 using a coupler 1889 such as a hinge 1889. The hinge 1889 may be any suitable hinge such as a simple (e.g., formed integrally with the base 1825, etc.) or a complex hinge. The hinge may provide a biasing force to open the movable clamping portion 1805 relative to the stationary clamping portion 1806. The stationary clamping portion 1806 may include a latch or pawl 1882 which may engage teeth 1888 of the movable clamping portion 1805 to lock the movable clamping portion 1805 relative to the stationary clamping portion 1806. A biasing member 1884 may bias the pawl 1882 to engage the teeth 1888. A latch release tab 1886 may be moved, e.g., by pushing or pulling a selected location of the biasing member 1884, by a user to disengage the pawl 1882 from the teeth 1888. The movable clamping portion 1805 relative to the stationary clamping portion 1806. When the CC 1880 is placed in the open position, a VCS may be inserted between and/or moved relative to one or more of one or more stationary clamping surfaces 1806a and the one or more movable clamping surfaces 1805a. However, when the CC 1880 is locked the one or more stationary clamping surfaces 1806x and the one or more movable clamping surfaces 1805x may exert a force against the VCS to hold it firmly in place.

It is envisioned that positioning of the pawl and the teeth may be reversed such as the pawl may be located on the movable clamping surface and the teeth may be located on the stationary clamping surface. This is illustrated with reference to FIGS. 19 and 20 below.

Figure 19:
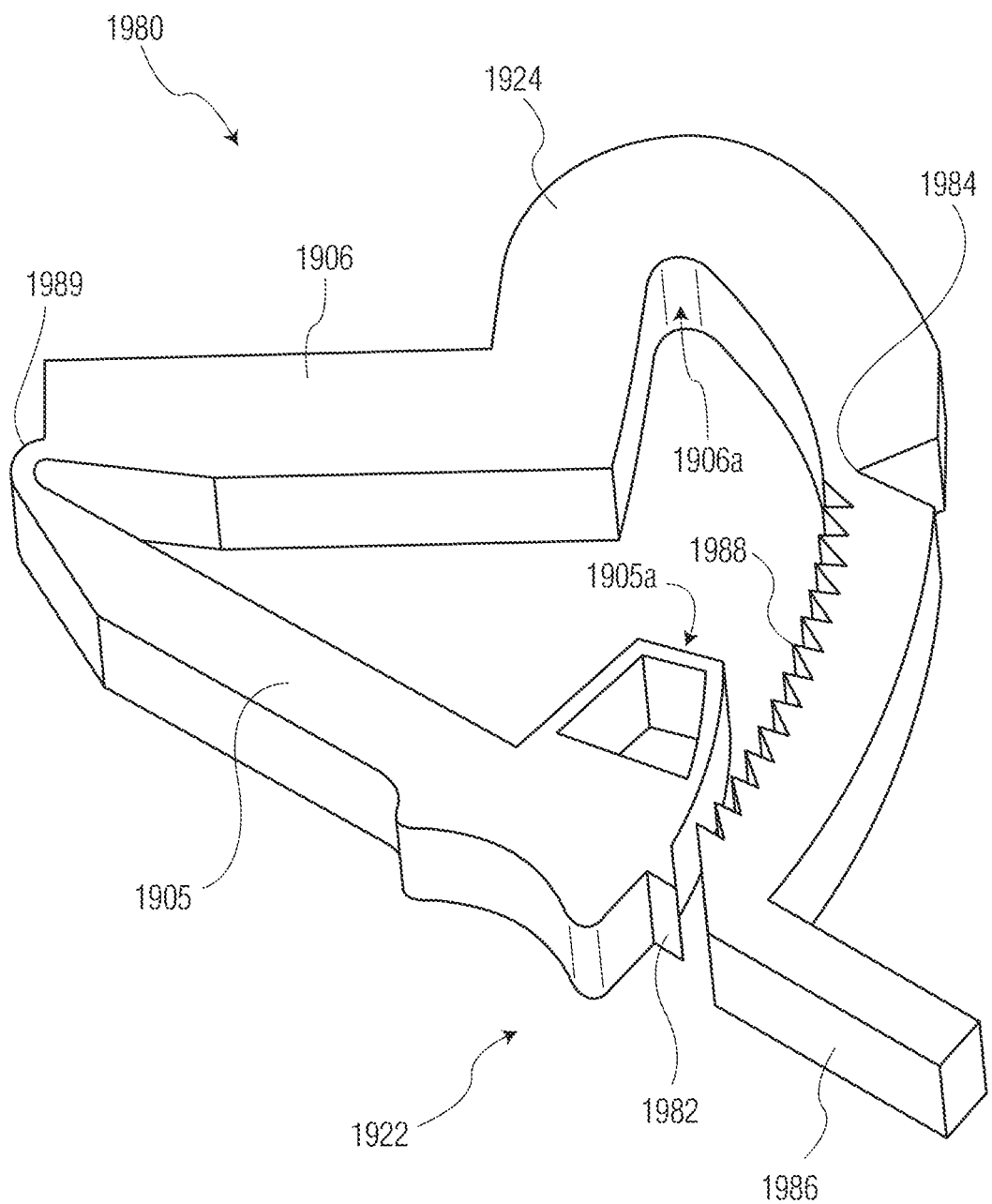

FIG. 19 shows a perspective view of a portion of a CC 1980 in accordance with embodiments of the present system. The CC 1980 may include a base 1924 including a locking coupler 1922 having a stationary clamping portion 1906 and a movable clamping portion 1905. The stationary clamping portion 1906 may include one or more stationary clamping surfaces 1906*a*. The movable clamping portion 1905 may include one or more movable clamping surfaces 1905*a*.

The movable clamping portion 1905 may be coupled to the stationary clamping portion 1906 using a coupler 1989 such as a hinge 1989. The hinge 1989 may be any suitable hinge such as a simple (e.g., formed integrally with the base 1924, etc.) or a complex hinge. The hinge may provide a biasing force to open the movable clamping portion 1905 relative to the stationary clamping portion 1906.

The movable clamping portion 1905 may include a latch or pawl 1982 which may engage teeth 1988 of the stationary clamping portion 1906 to lock the movable clamping portion 1905 relative to the stationary clamping portion 1906. One or more biasing members 1984 may bias the teeth 1988 against the pawl 1982 so that it engages the teeth 1988. A latch release tab 1986 may be moved, e.g., depressed, by a user to disengage the teeth 1988 from the pawl 1982. When the CC 1980 is open, a VCS may be inserted between and/or moved relative to one or more of one or more stationary clamping surfaces 1906*a* and the one or more movable clamping surfaces 1905*a*. However, when the CC 1980 is locked, the one or more stationary clamping surfaces 1906*a* and the one or more movable clamping surfaces 1905*a* may exert a force against the VCS to hold it firmly in place.

Figure 20:
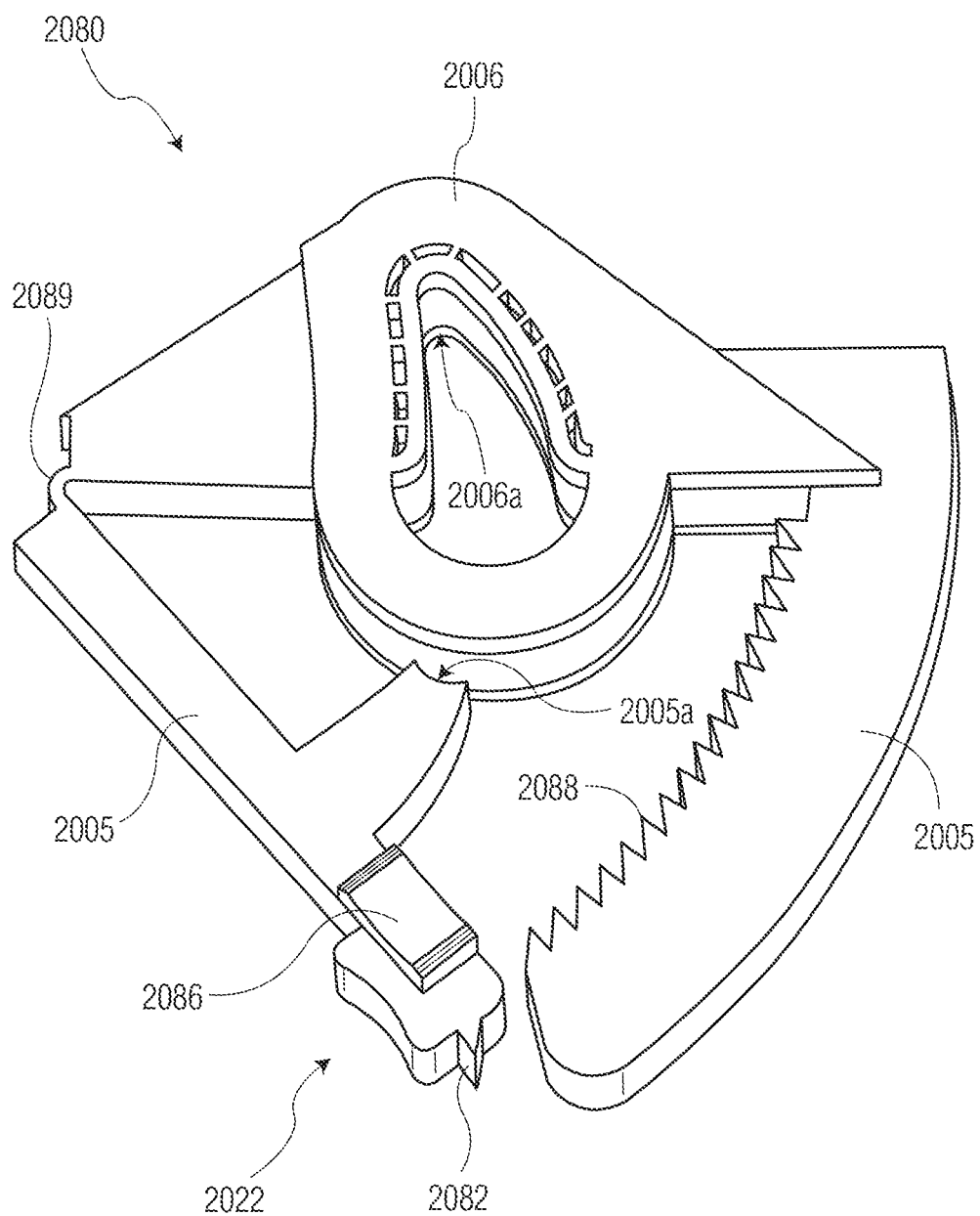

FIG. 20 shows a perspective view of a portion of a CC 2080 in accordance with embodiments of the present system. The CC 2080 may include a base 2024 including a locking coupler 2022 having a stationary clamping portion 2006 and a movable clamping portion 2005. The stationary clamping portion 2006 may include one or more stationary clamping surfaces 2006*a*. The movable clamping portion 2005 may include one or more movable clamping surfaces 2005*a*.

The movable clamping portion 2005 may be coupled to the stationary clamping portion 2006 using a coupler 2089 such as a hinge 2089. The hinge 2089 may be any suitable hinge such as a simple (e.g., formed integrally with the base 1725, etc.) or a complex hinge. The hinge may provide a biasing force to open the movable clamping portion 2005 relative to the stationary clamping portion 2006.

The movable clamping portion 2005 may include a latch or pawl 2082 which may engage teeth 2088 of the stationary clamping portion 2006 to lock the movable clamping portion 2005 relative to the stationary clamping portion 2006. One or more biasing members may bias the pawl 2082 against the teeth 2088 so that the pawl 2082 engages the teeth 2088. A latch release area tab 2086 may be moved, e.g., depressed, by a user to disengage the pawl 2082 from the teeth 2088. When the CC 2080 is open, a VCS may be inserted between and/or moved relative to one or more of one or more stationary clamping surfaces 2006*a* and the one or more movable clamping surfaces 2005*a*. However, when the CC 2080 is locked, the one or more stationary clamping surfaces 2006*a* and the one or more movable clamping surfaces 2005*a* may exert a force against the VCS to hold it firmly in place.

Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, any section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated;

i) the term "plurality of" an element includes two or more of the claimed element, and does not imply any particular range of number of elements; that is, a plurality of elements may be as few as two elements, and may include an immeasurable number of elements; and j) the term and/or and formatives thereof should be understood to mean that only one or more of the listed elements may need to be suitably present in the system in accordance with the claims recitation and in accordance with one or more embodiments of the present system.

What is claimed is:

1. A plant support system, comprising:
a support ring having at least one wall portion;
at least one support beam coupled to the at least one wall portion and configured to increase rigidity of the at least one wall portion;
a base coupled to the at least one wall portion and having at least one stationary clamping surface;
a clamp spine having a movable clamping surface situated opposite the at least one stationary clamping surface; and
a plurality of spring leaves coupled to the clamp spine and configured to bias the clamp spine.

2. The system of claim 1, further comprising at least one receiving anchor coupled to the support ring.

3. The system of claim 2, wherein the at least one receiving anchor further comprises at least one lock tab.

4. The system of claim 1, further comprising a handle coupled to the clamp spine.

5. The system of claim 4, further comprising an extension limiter coupled to the handle.

6. The system of claim 1, further comprising a travel limiter to limit displacement of the clamp spine.

7. The system of claim 6, wherein the travel limiter contacts a portion of the support ring at maximum displacement of the travel limiter.

8. The system of claim 1, wherein the plurality of spring leaves are arranged provide for freedom of motion of the clamp spine to a direction which is substantially parallel to a plane of the support ring.

9. The system of claim 1, wherein the plurality of spring leaves are arranged to reduce freedom of motion of the clamp spine in a direction which is substantially normal to a plane of the support ring.

10. A plant support system, comprising:
a support ring having at least one wall portion;
at least one support beam coupled to the at least one wall portion and configured to increase rigidity of the at least one wall portion;
a base coupled to the at least one wall portion and having at least one stationary clamping surface;
a clamp spine having a movable clamping surface situated opposite the at least one stationary clamping surface; and
a biasing mechanism to bias the clamp spine.

11. The system of claim 10, wherein the biasing mechanism comprises a plurality of spring leaves coupled to the clamp spine and configured to bias the clamp spine.

12. The system of claim 11, wherein the clamp spine is situated between opposed spring leaves of the plurality of spring leaves.

13. The system of claim 10, wherein the at least one support beam extends between separate interior portions of the at least one wall portion.

14. The system of claim 10, wherein the support ring forms a circular, square, or polygonal shape.

15. The system of claim 10, further comprising at least one receiving anchor coupled to from the support ring.

16. The system of claim 15, wherein the at least one receiving anchor further comprises at least one lock tab.

17. The system of claim 10, further comprising a handle coupled to the clamp spine.

18. The system of claim 10, further comprising a travel limiter to limit displacement of the clamp spine.

19. A method for forming a plant support, the method controlled by at least one controller, the method comprising acts of:
obtaining material; and
forming from the material a planar plant support comprising:
a support ring having at least one wall portion;
at least one support beam coupled to the at least one wall portion and configured to increase rigidity of the at least one wall portion;
a base coupled to the at least one wall portion and having at least one stationary clamping surface;
a clamp spine having a movable clamping surface situated opposite the at least one stationary clamping surface; and
a plurality of spring leaves coupled to the clamp spine and configured to bias the clamp spine, all formed integrally with each other.

20. The method of claim 19, further comprising an act of attaching the planer plant support to a vertical column support.

* * * * *